US008524302B2

(12) United States Patent
George et al.

(10) Patent No.: US 8,524,302 B2
(45) Date of Patent: Sep. 3, 2013

(54) NATURAL FLAVOUR ENHANCERS AND METHODS FOR MAKING SAME

(75) Inventors: Eapan George, Frisco, TX (US); Thomas Frank Hofmann, Neufahrn (DE); Timo Dominikus Stark, Kranzberg (DE)

(73) Assignee: Pepsico, Purchase, NY (US)

( * ) Notice: Subject to any disclaimer, the term of this patent is extended or adjusted under 35 U.S.C. 154(b) by 908 days.

(21) Appl. No.: 12/610,957

(22) Filed: Nov. 2, 2009

(65) Prior Publication Data

US 2011/0104351 A1 May 5, 2011

(51) Int. Cl.
*A23L 2/56* (2006.01)
(52) U.S. Cl.
USPC ......................................................... 426/535
(58) Field of Classification Search
USPC ......................................................... 426/535
See application file for complete search history.

(56) References Cited

U.S. PATENT DOCUMENTS

| | | | |
|---|---|---|---|
| 3,214,276 A | 10/1965 | Sakakibara et al. |
| 3,620,772 A | 11/1971 | Kitada et al. |
| 4,741,914 A | 5/1988 | Kimizuka et al. |
| 4,806,376 A | 2/1989 | Saeki et al. |
| 5,039,543 A | 8/1991 | Lee et al. |
| 5,045,335 A | 9/1991 | De Rooij et al. |
| 5,102,871 A | 4/1992 | Furukawa et al. |
| 5,314,704 A | 5/1994 | Lee |
| 5,679,397 A | 10/1997 | Kuroda et al. |
| 5,780,090 A | 7/1998 | Frerot et al. |
| 5,948,453 A | 9/1999 | Cerny et al. |
| 6,129,937 A | 10/2000 | Zurbriggen et al. |
| 6,432,459 B1 | 8/2002 | Bel Rhlid et al. |
| 6,495,184 B1 | 12/2002 | Zheng et al. |
| 6,562,391 B1 | 5/2003 | Vauthey et al. |
| 6,660,319 B1 | 12/2003 | Shi et al. |
| 7,108,884 B2 | 9/2006 | Nishimura et al. |
| 7,118,775 B2 | 10/2006 | Kohmura et al. |
| 7,160,570 B2 | 1/2007 | Nishiuchi et al. |
| 2004/0146633 A1 | 7/2004 | Ogasawara et al. |
| 2006/0083847 A1 | 4/2006 | Iwasaki et al. |
| 2008/0248175 A1 | 10/2008 | Hofmann et al. |
| 2008/0254187 A1 | 10/2008 | Hayashi et al. |
| 2008/0268122 A1 | 10/2008 | Renes et al. |
| 2008/0268123 A1 | 10/2008 | Hofmann et al. |
| 2009/0130282 A1 | 5/2009 | Hofmann et al. |
| 2009/0239310 A1 | 9/2009 | Ohsu et al. |
| 2010/0136197 A1 | 6/2010 | Eto et al. |

FOREIGN PATENT DOCUMENTS

| | | | |
|---|---|---|---|
| EP | 0181421 A1 | 5/1986 |
| JP | 61181357 A | 8/1986 |
| JP | 10276709 A | 10/1998 |
| JP | 10276710 A | 10/1998 |
| JP | 2007166902 A | 7/2007 |
| JP | 2007325513 A | 12/2007 |
| WO | 087361 A1 | 11/2002 |
| WO | 2005019165 A1 | 3/2005 |
| WO | 042288 A3 | 4/2007 |
| WO | 055393 A1 | 5/2007 |
| WO | WO 2007055393 A1 * | 5/2007 |

OTHER PUBLICATIONS

Artturi I. Virtanen, On Sulphur-Containing Amino Acids and γ-Glutamyl Peptides in the Bulbs and Seeds of Allium Species, BOT. MAG. Tokyo 79: 506-509 (1966).
Larry D. Lawsin, Zhen-Yu J. Wang, & Browyn G. Hughes, γ-Glutamyl-S-Alkylcysteines in Garlic and Other Allium Spp.: Precursors of Age-Dependent Trans-1-Propenyl Thiosulfinates, Journal of Natural Products, vol. 54, No. 2, pp. 436-444 (Mar.-Apr. 1991).
Yoichi Ueda, Makoto Sakaguchi, Kazuo Hirayama, Ryuichi Miyajima & Akimitsu Kimizuka, Charateristic Flavor Constituents in Water Extract of Garlic, Agric. Biol. Chem., 54 (1), 163-169 (1990).
Decker, Kimberly J., Cut the Calories, Keep the Flavor, posted on Nov. 7, 2006 on www.foodproductdesign.com/, Copyright 2009 by Virgo Publishing, printed Nov. 2, 2009, from URL http://www.foodproductdesign.com/articles/2006/11/cut-the-calories-keep-the-flavor.aspx, pp. 1-8.
Ueda et al., "Composition of Sulfur-Containing Components in Onion and their Flavor Characters" Food Research & Development Laboratories, Ajinomoto Co., Inc., Japan Society for Bioscience, Biotechnology, and Agrochemistry, Jun. 25, 1993.
Dini et al., "S-Alkenyl Cysteine Sulfoxide and its Antioxidant Propertiesfrom Allium cepa var. tropeana (Red Onion) Seeds" Journal of Natural Products, 2008, 71 (12), Abstract Only.
Rose et al., "Bioactive S-alk(en)yl cysteine sulfoxide metabolites in the genus Allium: the chemistry of potential therapeutic agents" Nat. Prod. Rep. (2005) 22, pp. 351-368.
Kalyanam et al., "Gamma-glutamyl dipeptides and amines" datasheet "Fine & Specialty Chemicals" Sabinsa Corporation Research & Development, 2008, found at http://www.drmajeed.com/articles/2008GammaGlutamylDipeptides.pdf.
Vermeulen et al., "Sensorial Contribution and Formation Pathways of Thiols in Foods: a Review" Food Reviews International (2005) 21, pp. 69-137.
Carson, "Chemistry and biological properties of onions and garlic" Food Reviews International, vol. 3, Issue 1 & 2,1987, pp. 71-103 (Abstract Only).
Mutsch-Eckner et al, "y-Glutamyl Peptides From Allium Sativum Bulbs" Phytochemistry (1992) vol. 31, No. 7, pp. 2389-2391.
Corzo-Martinez et al., "Biological properties of onions and garlic" Trends in Food Science & Technology 18 (2007) pp. 609-625.

* cited by examiner

*Primary Examiner* — Humera Sheikh
*Assistant Examiner* — Bhaskar Mukhopadhyay
(74) *Attorney, Agent, or Firm* — Colin P. Cahoon; Celina M. Orr; Carstens & Cahoon, LLP

(57) ABSTRACT

The present invention pertains to the use of certain flavor enhancing compounds obtainable from an *Allium* species. In one embodiment, seeds from chives, leeks, ramson and other onions are used for conveying strong kokumi flavor enhancing effects on food products without imparting an onion or garlic-like off taste. These flavor enhancing compounds are also useful for the preparation of Amadori products, which are also used as kokumi flavor enhancing compounds.

17 Claims, 6 Drawing Sheets

NATURAL FLAVOUR ENHANCERS AND METHODS FOR MAKING SAME

BACKGROUND OF THE INVENTION

1. Technical Field

The present invention relates to the extraction of flavour enhancers, which impart a kokumi sensation to foods. In particular, the present invention relates to specific peptides extracted from one or more edible plants and their use as flavour enhancers.

2. Description of Related Art

The food industry generally recognizes five basic tastes: sweet, salty, sour, bitter, and (most recently, as early as the 1990s) umami, which imparts a "brothy", "meaty", or "savoury" taste and is commonly associated with monosodium glutamate (MSG) and MSG-like tastes. The term "kokumi," on the other hand, is used in the food industry to refer to enhanced flavour sensations such as long lasting taste development (mouthfulness, continuity, duration and depth); punch (relating to the initial taste and impact); and roundness and balance (richness, thickness, spread, and unity). The kokumi sensation is a distinct flavour enhancing sensation that cannot be expressed by any of the five basic tastes alone. As such, the terms "taste" and "flavour" as used herein are meant to describe different properties, although they can be complimentary. Taste involves the detection of one of the five basic tastes. Flavour, on the other hand, is a combination of one or more tastes and/or sensations experienced at the same time. In particular, flavour includes both taste and smell, and can also include sensations such as vision and expectation or the like. Thus, a kokumi flavour-enhancing sensation or effect is obtained when enhancing and expanding (or multiplying) the basic tastes as well as the tastes and senses peripheral to the basic tastes including without limitation aroma, food texture, long-lasting taste development, balance and punch.

A number of attempts have been made to produce a kokumi sensation. These various attempts have revealed a variety of sulfur-containing amino acids, peptides, and γ-glutamyl peptides, which are usually tasteless on their own but provide a kokumi sensation or effect when added to various tastes such as MSG, ribonucleotide solutions (including nucleotides 5'-inosine monophosphate (IMP) and 5'-guanosine monophosphate (GMP)), or beef extracts. In particular, a number of organosulfur compounds isolated from onions (*Allium cepa*) and garlic (*Allium sativum* L.) have been shown to impart flavour enhancing sensations when combined with savoury compositions or food products. However, currently known flavour enhancers do not fully satisfy neutral taste and are not very potent. Prior art methods typically focus on isolation of compounds from the leaves of these plants, which tend to add a flavor of their own.

Consequently, there remains a need for kokumi compounds that enhance flavor, without adding a flavor of their own. There is also a need for more potent and effective kokumi compounds, while using natural extracts. In particular, there is a need for kokumi compounds that utilize the potential flavour content of other, often ignored, parts of an edible plant and methods for extracting and purifying flavouring enhancing compounds from other edible plants, in order to prepare foods having an increased kokumi sensation.

SUMMARY OF THE INVENTION

The present invention provides for flavour enhancing compounds, which are capable of imparting a kokumi sensation or effect when added to one or more inducing compositions or food products containing a glutamate and/or nucleic acid, as further described below. As used herein, a "flavour enhancing compound" is thus meant refer to any of the γ-L-glutamyl compounds and Amadori products described herein or a biologically acceptable salt thereof, which are capable of producing a kokumi flavouring-enhancing sensation or effect, and the term is used interchangeably with the terms "flavouring enhancer," "flavour compound," "kokumi compound," "kokumi peptide," or "peptide."

The flavouring enhancers of the present invention, in a first aspect, are prepared by extracting a number of compounds from the Alliaceae family including without limitation chive (*Allium schoenoprasum*), ramson (*Allium ursinum*), leek (*Allium ampeloprasum* var. *porrum* (L.)), and other onions as well as the seeds of these edible plants. Compounds represented by the general formulae (a) and (b) have never been used to impart a kokumi flavour enhancing sensation.

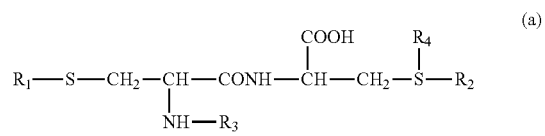

(a)

where $R_1$ and $R_2$ are each independently selected from the group consisting of $-CH_3$, $-CH_2CH_3$, $-CH=CH_2$, $-C\equiv CH$, $-CH_2CH_2CH_3$, $-CH=CHCH_3$, $-CH_2CH=CH_2$;

$R_3$ is a γ-glutamyl group or a salt thereof; and $R_4$ is selected from H or O, provided that when O is selected, the bond between $R_4$ and O is a double bond.

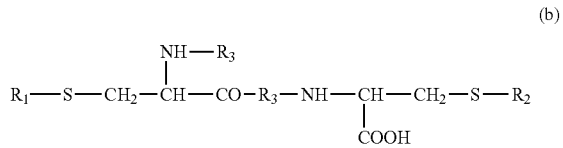

(b)

where $R_1$ and $R_2$ are each independently selected from the group consisting of $-CH_3$, $-CH_2CH_3$, $-CH=CH_2$, $-C\equiv CH$, $-CH_2CH_2CH_3$, $-CH=CHCH_3$, $-CH_2CH=CH_2$; and $R_3$ is a γ-glutamyl group or a salt thereof.

Sensory tests show that the compounds according to formulae (a) and (b) are flavour enhancing compounds, capable of providing a strong kokumi sensation when added to various inducing compositions, defined below. In particular, among the γ-L-glutamyl peptides extracted from the seeds, the tripeptide γ-L-glu-(E)-S-(propen-1-yl)-L-cys-(E)-S-(propen-1-yl)-L-cys-(+/−)-SO [γ-L-Glu-L-Cys-L-Cys-(+/−)-SO], represented below by formula (I), was identified, isolated and purified and surprisingly shown to impart a strong kokumi sensation.

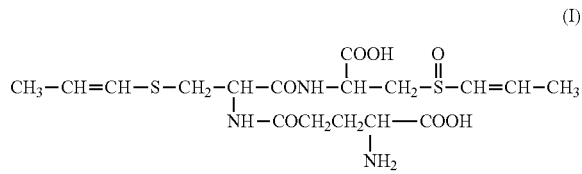

(I)

In addition, the tetrapeptide γ-L-glutamyl-(E)-S-1-propenyl-L-cysteinyl-γ-L-glutamyl-(E)-S-1-propenyl-L-cysteine[γ-L-Glu-L-Cys-γ-L-Glu-L-Cys], seen below as formula (II), was identified, isolated, and purified. Standard abbreviations are used to depict the amino acid residues of the present invention.

FIG. 2 illustrates the enzymatic breakdown of the tripeptide according to Formula (I) with Carboxypeptidase A.

FIG. 3 depicts the tetrapeptide according to formula (II) and its $^1$H-NMR-spectrum.

FIG. 4 illustrates the enzymatic breakdown of the tetrapeptide according to formula (II) with γ-glutamyl transpeptidase.

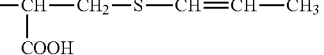

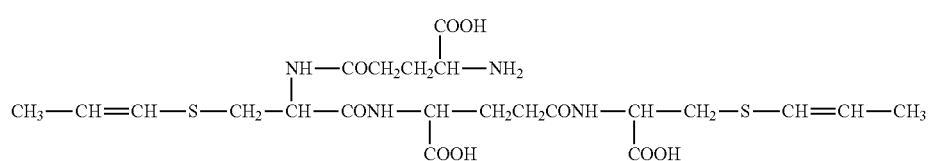

In a second aspect, the present invention relates to flavor enhancing compounds obtainable by subjecting the extracted flavouring compounds from the *Allium* genus to a Maillard reaction with reducing sugars. The reaction products are then used to impart a kokumi enhanced flavour sensation. Extraction and purification processes can be performed by any means known in the art. In test runs, for example, the extraction was performed with water, ethanol, or ethanol/water mixtures. The extract was then concentrated by freeze-drying and further concentrated by reversed-phase chromatography.

Sensory tests subjecting the flavour enhancing compounds to organoleptic evaluation indicate that the isolated flavouring compounds are substantially tasteless in the form of an aqueous solution, but are useful for imparting the enhanced effects when added even in small amounts to certain inducing compositions or food products containing a glutamate and/or nucleic acid as further described below. While the effective amounts will vary among individuals, generally, 2-100 fold above the threshold is sufficient when using chicken broth as the matrix. The thresholds given herein are meant to reflect minimum amounts for use in chicken broth as a matrix; however, one skilled in the art, armed with this disclosure, will recognize that this amount can be adjusted, either higher or lower, dependent upon the matrix used and the desired intensity of the kokumi effect. In general, a certain amount of salt is also necessary to achieve the kokumi effect; typically, about 12 mmol/L, which is found naturally in nearly all food products. The compounds can be applied to different kinds of foods including without limitation snacks, soups, cereals, sauces, fish, and fish paste.

Other aspects, embodiments and features of the invention will become apparent from the following detailed description of the invention when considered in conjunction with the accompanying drawings. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
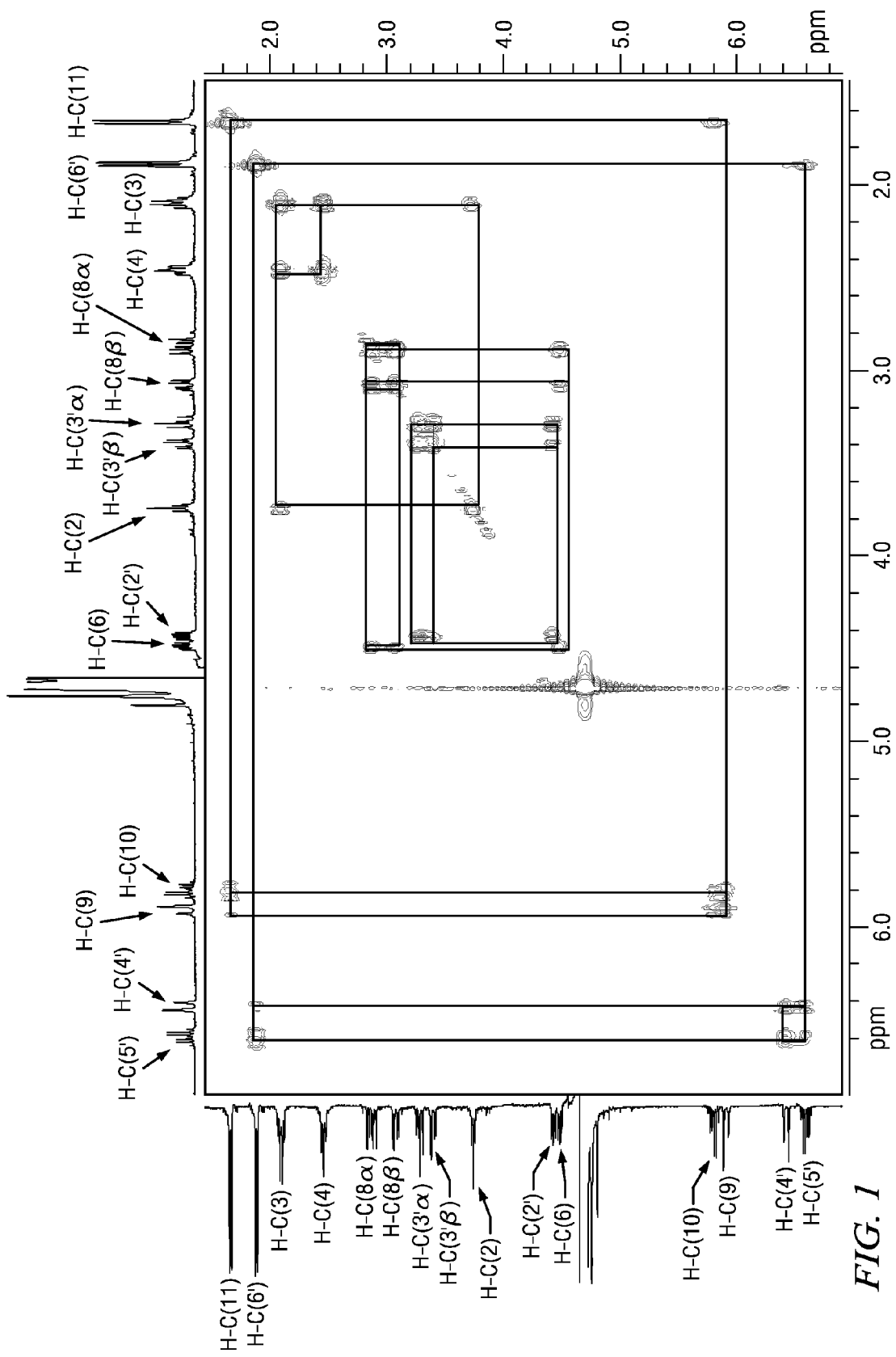
FIG. 1 depicts the g-COSY-NMR-spectrum of the tripeptide according to formula (I).

In order to produce the flavouring compounds and implement the method of the present invention, an *Allium* species is first selected and prepared. Suitable plants that be used, for example, include without limitation, those of *Allium schoenoprasum, Allium sativum, Allium sibiricum, Allium ursinum, Allium ampeloprasum, Allium porrum*, and *Allium cepa*. A selected *Allium* species is then crushed into a mash. Raw material is destroyed or crushed by any means known in the art. In one embodiment, the seeds of Alliaceae, are used as the starting material; in particular, the seeds of chive (*Allium schoenoprasum*), ramson (*Allium ursinum*), or leek (*Allium ampeloprasum* var. *porrum* (L)). It has been found that the extracts from the seeds of the Alliaceae family provide for potent flavouring enhancement without imparting the strong "oniony" taste characteristic of the Alliaceae family. After preparing an *Allium* species mash, one or more compounds are isolated and purified. Combining one or more of the purified compounds with at least one inducing composition to produce a desired kokumi effect. For purposes of the present invention, a suitable "inducing composition" is meant to refer to at least one substance, food, or solution containing a glutamate and/or a nucleic acid, including without limitation MSG, ribonucleotides (including without limitation inosinate, guanylate and adenylate such as the nucleotides 5'-inosine monophosphate (IMP) and 5'-guanosine monophosphate (GMP)), meat, poultry, seafood, vegetables, beef extract, yeast extract, soy extract, seaweed, beef, pork, chicken, tomatoes, mushrooms, soybeans, potatoes, corn, sweet potatoes, carrots, parmesan cheese, green tea, and any other taste associated with MSG or salt.

A first aspect of the present method relates generally to flavour-enhancing γ-glutamyl peptides extracted from *Allium* seeds and their use as flavour enhancing compounds. The flavour-enhancing compounds of the present invention can be used to impart a kokumi flavour-enhancing sensation to one or more of the basic tastes (sweet, salty, sour, bitter and umami) so long as at least one inducing composition is present. In one embodiment, the method relates to cysteine derivatives and their sulfoxides. In another embodiment, the method relates to dipeptides, wherein the amino acids comprise both glutamic acid and cysteine or its derivatives. In another embodiment, the method relates to tripeptides and their derivatives, wherein a first amino acid is glutamic acid, a second amino acid is cysteine and a third amino acid is selected from the group consisting of glycine, cysteine and glutamic acid. In another embodiment, the method relates to a tetrapeptide consisting of two glutamic acids groups and two cysteinyl groups. Specific peptides are further described below. A second aspect of the present invention generally relates to the Maillard reaction products of the flavour enhancing compounds according to the first aspect described above and their use as flavour enhancing compounds.

More specifically, in a first aspect, compounds represented by the general formulae (a) and (b) have never been used to impart a kokumi flavour enhancing sensation.

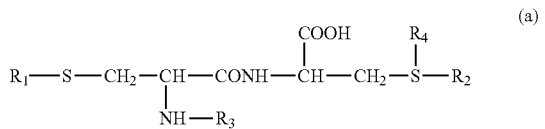

(a)

where $R_1$ and $R_2$ are each independently selected from the group consisting of —$CH_3$, —$CH_2CH_3$, —$CH=CH_2$, —$C\equiv CH$, —$CH_2CH_2CH_3$, —$CH=CHCH_3$, —$CH_2CH=CH_2$;

$R_3$ is an L-γ-glutamyl group or a salt thereof; and
$R_4$ is selected from H or O, and in the event that O is selected, the bond between $R_4$ and O is a double bond.

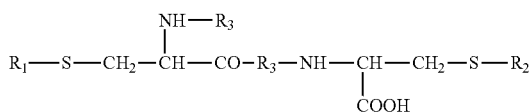

(b)

where $R_1$ and $R_2$ are each independently selected from the group consisting of —$CH_3$, —$CH_2CH_3$, —$CH=CH_2$, —$C\equiv CH$, —$CH_2CH_2CH_3$, —$CH=CHCH_3$, —$CH_2CH=CH_2$; and
$R_3$ is an γ-glutamyl group or a salt thereof.

A compound of formula (a) or (b) may be present in the form as shown or in its ionic form with or without a counter-ion, for example, its sodium, potassium, calcium, ammonium, chloride, sulfate, phosphate, carbonate salt, or similar. Additionally, a compound of formula (a) or (b) may be present in either the reduced form as shown or its oxidized forms. The amino acid residues are L-amino acids. The configuration of the sulfoxide can be S or R. In one aspect of the present invention one or more compounds of either formula (a) or (b), or mixtures thereof are used to impart enhanced flavouring.

In particular, among the flavour enhancing compounds extracted from the seeds in the present invention, the tripeptide γ-L-glu-(E)-S-(propen-1-yl)-L-cys-(E)-S-(propen-1-yl)-L-cys-(+/−)-SO [γ-L-Glu-L-Cys-L-Cys-(+/−)-SO], represented below by formula (I), was isolated and purified. Generally, sulfoxides were shown to demonstrate lower kokumi effects than their corresponding non-sulfoxides. However, the tripeptide according to formula (I) shows a surprisingly highly potent kokumi effect, being capable of providing the kokumi sensation when added in an amount as small as approximately 18 mg/L or 40 μmol/L.

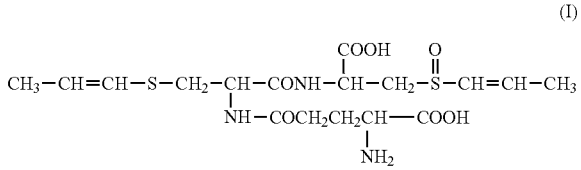

(I)

In addition, the tetrapeptide γ-L-glutamyl-(E)-S-1-propenyl-L-cysteinyl-γ-L-glutamyl-(E)-S-1-propenyl-L-cysteine[γ-L-Glu-L-Cys-γ-L-Glu-L-Cys], seen below as formula (II) was isolated, purified, and shown to be useful as a flavour enhancing compound even when added in an amount as small as approximately 56 mg/L or 100 μmol/L.

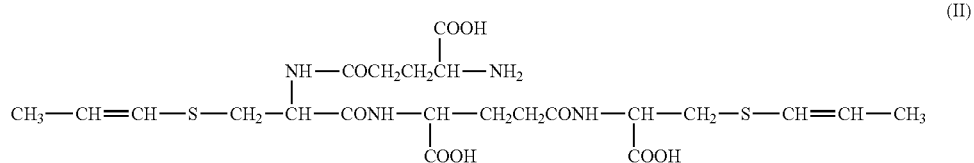

(II)

Substantially purified compounds of formulae (I) and (II) were shown in sensory tests, the results of which are further discussed below, to provide a strong flavour enhancing sensation when added to various inducing compositions or foods as defined herein. Further, because asymmetric carbon atoms are present in the structure of the compounds (I) and (II) of the present invention, they can also occur in the form of a number of configurational isomers that can also be used satisfactorily for the imparting a kokumi effect to foods, either individually, or as mixtures of isomers. Generally, isomers suitable for the present invention include variation of the amino acid sequence, a change in the configuration of chiral center of an amino acid, a change of cis/trans bonding, and changing from 1-propenyl to 2-propenyl(allyl) bonding. In addition, the unsaturated aliphatic hydrocarbon group can be an [E], [Z], or allylic configuration. Cis bonding may provide a stronger kokumi sensation in some embodiments.

The flavour enhancing compounds of the present invention are isolated by any means known in the art, which include without limitation various known chromatographic techniques such as, for example, normal phase high performance liquid chromatography (HPLC), reversed phase HPLC (RP- HPLC), ion-exchange chromatography, gel filtration chromatography, affinity chromatography, solid-phase extraction (SPE), gel permeation chromatography (GPC), ultrafiltration (UF), and fast centrifugal partition chromatography (FCPC). Concentration procedures include without limitation freeze-drying, membrane concentration, and vacuum concentration. It is possible to obtain a powdery seasoning containing the γ-L-glutamyl peptides of the present invention having excellent storage stability without having to add table salt by spray-drying or freeze-vacuum drying. Solvents that may be used are known to those skilled in the art and include without limitation any food grade solvent such as water, ethanol, methanol, and/or any mixtures thereof.

By way of example, in test runs, 100 g of *Allium schoenoprasum* seeds were suspended in 500 ml of either purified water (available, for example, from MILLIPORE® Corporation), ethanol, or 1:1 water/ethanol solutions. The seeds were crushed and dispersed with a high shear mixer (ULTRA TURRAX® (IKA)) for about 10 minutes. The crushed seeds were then extracted with the respective solvents mentioned above for about 2 hours. The extract (filtrate) was obtained by siphoning the liquid and extracting the obtained residue (filter cake) again with the solvents and amounts mentioned above. The extracting and filtration processes were repeated four times, and the filtrates obtained were united. In cases of using ethanol or water/ethanol mixtures, the organic solvent was evaporated under a vacuum at 40° C. and the remaining water fraction freeze-dried, yielding about 20 g (20% by weight). When extracting with ethanol, the extract was a slightly brown-colored powder. Methanol extractions also yielded a slightly brown-colored powder. Both extractions further yielded almost identical textures and peak patterns when analyzed by HPLC.

In order to remove polar compounds, such as amino acids, organic acids, sugars and carbohydrates, polyoles (sugar alcohols) and concentrate and enrich the desired target compounds, a number of purification techniques can be used; including without limitation, RP-HPLC, MPLC, SPE, liquid chromatography, affinity chromatography, ion exchange chromatography, and ultrafiltration. For instance, the following processes, further described below, were used to purify the products of the present invention: (i) solid phase extraction (SPE) with RP-cartridges (Giga tubes, for example from PHENOMENEX®); (ii) preparative RP column chromatography with packed (RP-material) glass columns; and (iii) preparative RP medium pressure column chromatography.

(i) Solid-Phase Extraction

The Solid Phase Extraction (SPE) method was used to remove polar compounds and increase purity. Aliquots (1 g each) of the extract were dissolved in 10 mL of purified water and then applied to a C18 resin in a column Strata C-18-E (10 g/60 mL, Giga tubes, 55 μm, 70 A, PHENOMENEX®) preconditioned with ethanol, followed by water. Fractionation was performed by flushing the column with water (30 mL, fraction S1), followed by ethanol/water (1/1, v/v; 30 mL; fraction S2), and ethanol (30 mL; fraction S3). The fractions S2-S3 collected were concentrated in a vacuum and, freeze-dried twice. Water fraction could be discarded.

(ii) Packed (RP-Material) Glass Columns

Aliquots (1 g-5 g) of the extract were dissolved in about 5 to about 10 mL of purified water and then applied to a water-cooled glass column (40×140 mm) packed with LICHROPREP® (25-40 μm particle size) RP-18 material in the same solvent mixture. Chromatography was performed by using aqueous formic acid (0.1% in water; pH 2.5, 200 mL) or purified water, followed by the same formic acid solution or purified water containing increasing amounts of ethanol up to 100%. The effluent was collected in subfractions, which were then concentrated in a vacuum and freeze-dried twice. Water fraction could be discarded. The subfractions could be separately used or united to have one, of polar compounds removed, extract. Chromatography was performed at a flow rate of 2-3 mL/min and recorded at a wavelength of 220 nm.

(iii) Preparative RP Medium Pressure Column Chromatography

Aliquots (1 g-4-g) of the extract were dissolved in about 5 to about 50 mL of purified water. Aliquots of about 5 to about 20 mL were injected into a preparative chromatography system (Bëchi SEPACORE®). The PP cartridge (column) (40× 150 mm) was filled with a slurry of LICHROPREP® (25-40 μm particle size) RP-18 material in the same solvent mixture. Chromatography was performed with about 200 mL of aqueous formic acid (0.1% in water) at a pH of 2.5, or purified water, followed by the same formic acid solution or purified water containing increasing amounts of ethanol up to 100%. The effluent was collected in subfractions. The subfractions collected were concentrated in a vacuum and freeze-dried twice. Water fraction was discarded. The subfractions could be separately used or united to have one, of polar compounds removed, extract. Chromatography was performed at a flow rate of 50 mL/min and recorded at a wavelength of 220 nm.

Following purification, the flavouring compounds described herein were identified using Multiple Reaction Monitoring (MRM)-triggered MS/MS scans. Combined HPLC and electrospray ionization mass spectrometry (LC-ESI-MS) analysis was also used for identifying the peptides of the present invention. Further detail for the structure elucidation of the compounds according to formulae (I) and (II) follow. Unless otherwise indicated or claimed, the details provided below with regard to identification are not meant to limit the scope of the present invention.

Identification of the tripeptide γ-L-glutamyl-(E)-S-1-propenyl-L-cysteinyl-S-1-propenyl-L-cysteine-(+/−)-SO[γ-L-Glu-L-Cys-L-Cys-(+/−)-SO] from the seeds of chive.

FIG. 1 depicts the Gradient Selected COrrelation SpectroscopY (COSY) g-COSY-NMR-spectrum of the identified and purified tripeptide of the present invention, which is represented below by formula (I), having the name γ-L-glu-trans-S-(propen-1-yl)-L-cys-trans-S-(prop en-1-yl)-L-cys-(+/−)-SO [γ-Glu-PeC-PeC-SO].

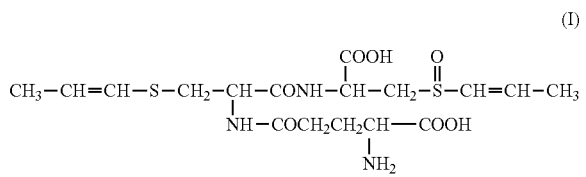

(I)

As depicted in FIG. 1, the compound according to formula (I) showed the typical UV/Vis absorption maxima expected for S-alkenylcysteines, and showed a pseudomolecular ion [M−H]⁻ ion with m/z 448 as well as the fragment ions m/z 128, 314, and 240 in the MS-ESI⁻ spectrum. High resolution LC-MS (ESI⁻) analysis confirmed the compound to have the molecular formula $C_{17}H_{27}N_3O_7S_2$. From the $^1$H NMR, five discrete spin systems could be discerned. The proton sequence within each spin system was elucidated by the series of cross-signals in the g-COSY spectrum of FIG. 1.

All the proton resonances of this compound were associated unambiguously with the relevant carbon atoms from the $^1$H—$^{13}$C heteronuclear single quantum coherence (gHSQC) spectrum, while data arising from the heteronuclear multiple bond correlation spectroscopy (g-HMBC) experiment were used to interconnect the partial structures. Thus, the dd corresponding to the proton H—C(11) at 1.76 ppm coupled to protons H—C(9) and H—C(10), which coupled to each other. The double bond isomerism was E on the basis of the coupling constant J=14.8 Hz. The second spin system was very similar to the already described, with the difference that all signals were clearly downfield shifted (protons 6', 4' and 5'). Again, the double bond isomerism was E on the basis of the coupling constant J=15.2 Hz. The proton resonances at 2.97 H—C(8α) (dd, 8.4, 14.4 Hz) and 3.17 H—C(8β) (dd, 5.2, 13.2 Hz) were located as part of an ABX spin system, which is completed with the proton H—C(6) (dd, 5.2, 8.4 Hz) at 4.58 ppm and were assigned to the methylene group of cysteine. This ABX spin system could be observed twice, revealing the fourth discrete spin systems, in which in comparison the both dd of the methylene group H—C(3'α) at 3.37 ppm and H—C(3'β) at 3.49 ppm were again clearly downfield shifted. These values are a typical feature of all S-substituted cysteine sulfoxide derivatives. The fifth spin system revealed a coupling between the methylene group with a chemical shift of 2.19 ppm and the methylene group at 2.55 ppm as well as the proton at 3.84 ppm, as expected for an N-terminal glutamic acid moiety. Chemical shifts, intensities, coupling constants and observed cross-signals in g-COSY experiment were summarized for all protons in Table 1, below.

TABLE 1

Assignment of $^1$H-NMR signals of γ-L-glutamyl-S-trans-(propen-1-yl)-L-cysteinyl-(+/−)-S-trans-(propen-1-yl)-L-cysteine sulfoxide (400 MHz, D$_2$O)

| H at relevant C atom[a] | δ [ppm][b] | I[c] | M[c] | J (Hz)[c] | COSY[d] |
|---|---|---|---|---|---|
| 11 | 1.76 | 3 | dd | 1.2/6.4 | H—C(9), H—C(10) |
| 6' | 1.98 | 3 | dd | 1.2/6.8 | H—C(5') |
| 3 | 2.19 | 2 | m | 6.4/7.6 | H—C(2), H—C(4) |
| 4 | 2.55 | 2 | m | 7.6 | H—C(3) |
| 8α | 2.97 | 1 | dd | 8.4/14.4 | H—C(8β), H—C(6) |
| 8β | 3.17 | 1 | dd | 5.2/14.4 | H—C(8α), H—C(6) |
| 3'α | 3.37 | 1 | dd | 8.8/13.2 | H—C(3'β), H—C(2') |
| 3'β | 3.49 | 1 | dd | 4.4/13.2 | H—C(3'α), H—C(2') |
| 2 | 3.84 | 1 | t | 6.4 | H—C(3) |
| 2' | 4.53 | 1 | dd | 4.4/9.2 | H—C(3'α), H—C(3'β) |
| 6 | 4.58 | 1 | dd | 5.2/8.8 | H—C(8α), H—C(8β) |
| 10 | 5.89 | 1 | m | 6.4/14.8 | H—C(9), H—C(11) |
| 9 | 6.00 | 1 | dd | 1.2/14.8 | H—C(11), H—C(10) |
| 4' | 6.52 | 1 | dd | 1.6/15.2 | H—C(5'), H—C(6') |
| 5' | 6.69 | 1 | m | 6.8/15.2 | H—C(4'), H—C(6') |

[a]Arbitrary numbering of carbon atoms refers to structure in FIG. 1.
[b]The $^1$H chemical shifts are given in relation to TMSP.
[c]Determined from 1D-spectrum.
[d]Homonuclear $^1$H, $^1$H connectivities observed by g-COSY experiment.

A comparison of the $^{13}$C NMR spectrum showing 17 signals with the results of the Distortionless Enhancement by Polarization Transfer (DEPT-135) experiment exhibiting 13 signals as well as the g-HSQC experiment, revealed four signals corresponding to quarternary carbon atoms. Unequivocal assignment of these quarternary carbon atoms and the hydrogen-substituted carbon atoms, respectively, could be successfully achieved by means of HMBC optimized for $^2J_{C,H}$ and $^3J_{C,H}$ coupling constants and HSQC optimized for $^1J_{C,H}$ coupling constants, respectively. Additionally, the HMBC experiment revealed a correlation between the protons H—C(2', 6, 8) and neighbouring carbon atom C(7) as well as between the protons H—C(3, 4, 6) and neighbouring carbon atom C(5), thus demonstrating clearly the intramolecular linkage of the two cysteinyl and γ-glutamyl moiety. Chemical shifts and heteronuclear $^1$H, $^{13}$C connectivity via $^1$J(C,H) and $^{2+3}$J(C,H) were summarized for all carbon atoms in Table 2, below.

TABLE 2

Assignment of $^{13}$C-NMR signals of γ-L-glutamyl-S-trans-(propen-1-yl)-L-cysteinyl-(+/−)-S-trans-(propen-1-yl)-L-cysteine sulfoxide (400 MHz, D$_2$O)

| | | | heteronuclear $^1$H, $^{13}$C connectivity[d] | |
|---|---|---|---|---|
| C atom[a] | δ[b] | DEPT[c] | via $^1$J(C, H) | via $^{2,3}$J(C, H) |
| 6' | 17.4 | CH$_3$ | 6' | 4', 5' |
| 11 | 17.6 | CH$_3$ | 11 | 9, 10 |
| 3 | 26.2 | CH$_2$ | 3 | 2, 4 |
| 4 | 31.3 | CH$_2$ | 4 | 2, 3 |
| 8 | 33.8 | CH$_2$ | 8α, 8β | 6, 9 |
| 2' | 49.3 | CH | 2' | 3'α, 3'β |
| 6 | 53.2 | CH | 6 | 8α, 8β |
| 2 | 53.8 | CH | 2 | 3, 4 |
| 3' | 54.5 | CH$_2$ | 3'α, 3'β | 2' |
| 9 | 120.8 | CH | 9 | 8α, 8β, 10, 11 |
| 4' | 130.0 | CH | 4' | 3'α, 3'β, 5', 6' |
| 10 | 131.0 | CH | 10 | 11, 9 |
| 5' | 144.0 | CH | 5' | 4', 6' |
| 7 | 171.5 | CO | 7 | 2', 6, 8 |
| 1 | 173.5 | COOH | 1 | 2, 3 |
| 1' | 173.7 | COOH | 1' | 2', 3' |
| 5 | 174.6 | CO | 5 | 3, 4, 6 |

[a]Arbitrary numbering of carbon atoms refers to structure in FIG. 1.
[b]The $^{13}$C chemical shifts are given in relation to TMSP.
[c]DEPT-135 spectroscopy and g-HSQC.
[d]Assignments based on HSQC ($^1$J) und HMBC ($^{2,3}$J) experiments.

Figure 2:
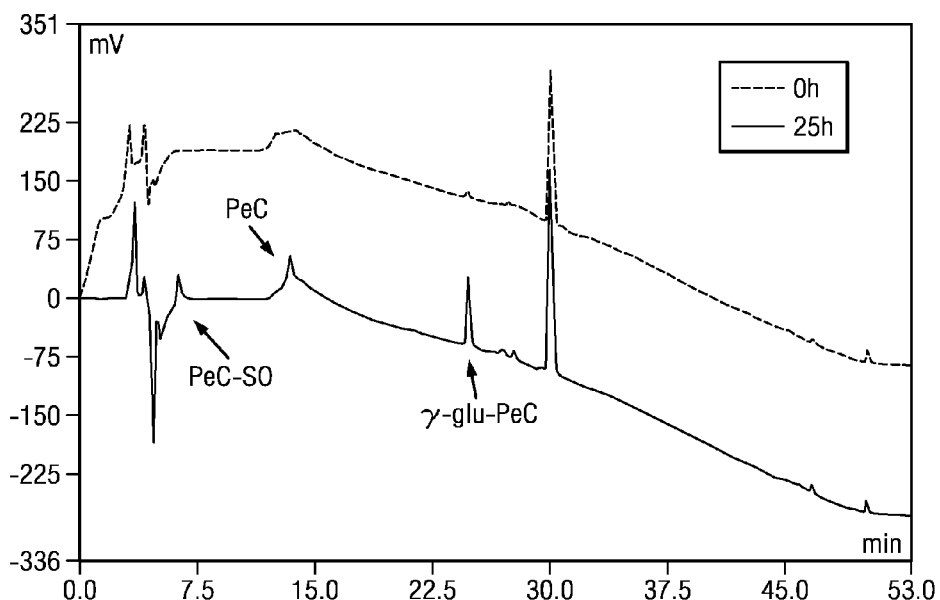

To confirm the structure of the compound according to formula (I), more precisely the intramolecular linkage of the tripeptide, as well as the configuration of the amino acids, enzymatic degradation with carboxypeptidase A and γ-glutamyltranspeptidase was performed. Carboxypeptidase A hydrolyzes only α-peptide bonds, if the amino acid is L-form. As depicted in FIG. 2, the C-terminus of the tripeptide could be substantiated as S-trans-(propen-1-yl)-L-cysteine sulfoxide, because after 25 h of treatment with this enzyme, the two expected degradation products, namely the dipeptide γ-L-glutamyl-5-trans-(propen-1-yl)-L-cysteine and S-trans-(propen-1-yl)-L-cysteine sulfoxide could be clearly determined by HPLC, and cochromatography with the reference compounds. Additionally, enzymatic degradation with γ-glutamyltranspeptidase revealed the expected liberation of L-glutamic acid, and the dipeptide S-trans-(propen-1-yl)-L-cysteinyl-(+/−)-S-trans-(propen-1-yl)-L-cysteine sulfoxide, which decompose when the reaction time was lengthened into the two corresponding amino acids, which could be clearly determined by HPLC, and cochromatography with the reference compounds.

The isolated γ-glutamyl tripeptide is structurally unique because it contains 5-(propen-1-yl)-L-cysteine both in reduced and oxidized from. The reduced form is connected through a γ-peptide bond to L-glutamic acid and the oxidized from through a α-peptide bond to the reduced propenyl cysteine.

Identification of the tetrapeptide γ-L-glutamyl-(E)-S-(propen-1-yl)-L-cysteinyl-α-L-glutamyl-γ-(E)-S-(propen-1-yl)-L-cysteine from the seeds of chive.

Figure 3:
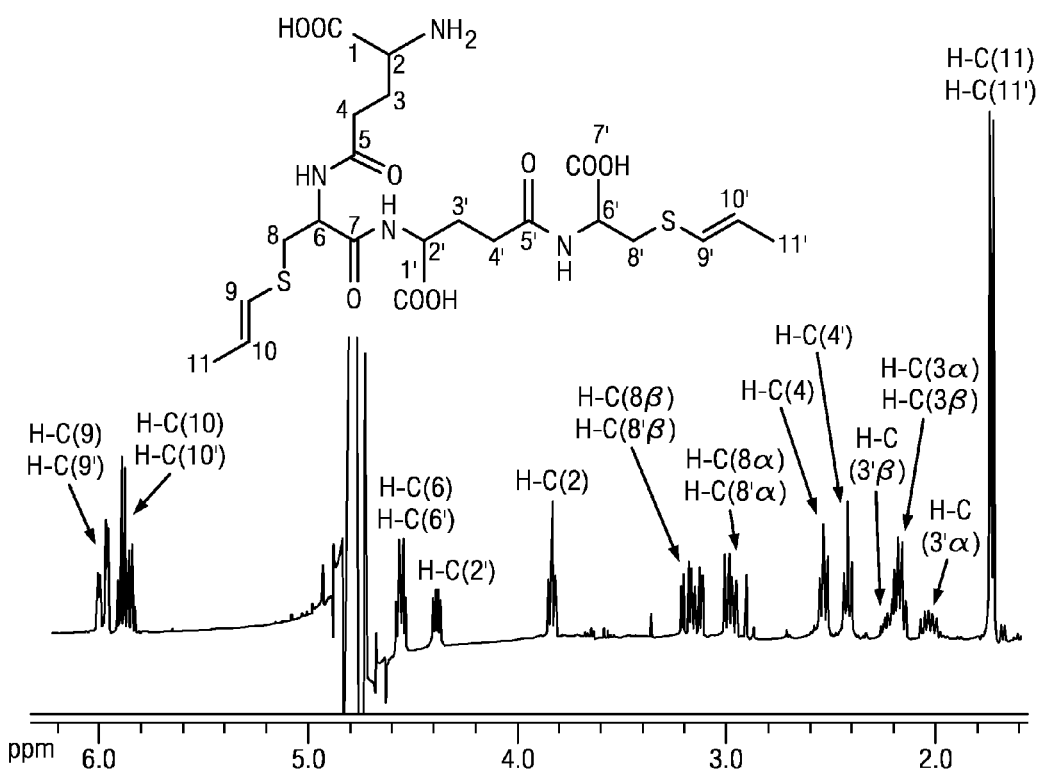

FIG. 3 depicts the $^1$H NMR spectrum of an identified and purified tetrapeptide of the present invention, which is represented below by formula (II), having the name γ-L-glutamyl-(E)-S-1-propenyl-L-cysteinyl-γ-L-glutamyl-(E)-S-1-propenyl-L-cysteine[γ-Glu-PeC-γ-Glu-PeC].

shifts of 2.03 and 2.25 ppm and the methylene group H—C(4') at 2.42 ppm as well as the double doublet H—C(2') at 4.38 ppm, as expected for a glutamic acid moiety, which is con-

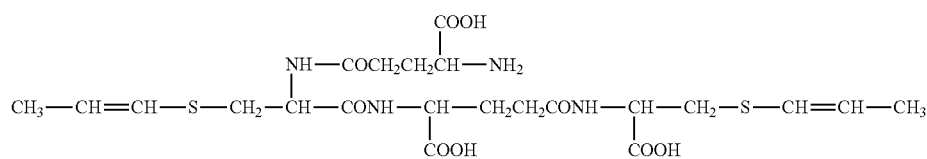

(II)

FIG. 3 illustrates that the compound according to formula (II) showed the typical UV/Vis absorption maxima expected for S-alkenylcysteines, and showed a pseudomolecular ion [M−H]⁻ ion with m/z 561 as well as the fragment ion m/z 128 in the MS-ESI-spectrum. High resolution LC-MS (ESI⁻) analysis confirmed the compound to have the molecular formula $C_{22}H_{34}N_4O_9S_2$. From the $^1$H NMR in FIG. 3, six discrete spin systems could be discerned, in which three spin systems occur in a very similar manner. The proton sequence within each spin system was elucidated by the series of cross-signals in the g-COSY spectrum.

All the proton resonances of this compound were associated unambiguously with the relevant carbon atoms from the g-HSQC spectrum, while data arising from the g-HMBC experiment were used to interconnect the partial structures. Thus, the dd with the intensity of six corresponding to the protons H—C(11) and H—C(11') at 1.73 ppm coupled to protons H—C(9/9') and H—C(10/10'), which coupled to each other. The double bond isomerism was in both cases E on the basis of the coupling constant J=14.8 Hz. The proton resonances at 2.97 H—C(8α') (dd, 1.6, 14.4 Hz), 2.99 H—C(8α) (dd, 1.6, 14.4 Hz) and 3.14 H—C(8β') (dd, 5.2, 14.4 Hz) as well as 3.19 H—C(8β) (dd, 4.4, 14.4 Hz) were located as part of two ABX spin systems, which were completed with the protons H—C(6/6') (m, 1.6, 4.4, 5.2, 5.6 Hz) at 4.56 ppm and were assigned to the methylene groups of cysteine. The fifth spin system revealed a coupling between the diastereotopic protons of the methylene group H—C(3'αβ) with chemical nected via an amide bond to an other amino acid. The sixth spin system revealed a coupling between the methylene group H—C(3) with a chemical shift of 2.17 ppm and the methylene group H—C(4) at 2.54 ppm as well as the triplet H—C(2) at 3.84 ppm, as expected for a N-terminal glutamic acid moiety. Chemical shifts, intensities, coupling constants and observed cross-signals in g-COSY experiment are summarized for all protons in Table 3, below.

TABLE 3

Assignment of $^1$H-NMR signals of γ-L-glutamyl-(E)-S-(propen-1-yl)-L-cysteinyl-α-L-glutamyl-γ-(E)-S-(propen-1-yl)-L-cysteine (400 MHz, D$_2$O)

| H at relevant C atom[a] | δ [ppm][b] | I[c] | M[c] | J (Hz)[c] | COSY[d] |
|---|---|---|---|---|---|
| 11, 11' | 1.73 | 6 | dd | 1.2, 6.4 | H—C(9, 9'), H—C(10, 10') |
| 3'α | 2.03 | 1 | m | 7.2, 9.2, 14.4 | H—C(2'), H—C(3'β), H—C(4') |
| 3α, 3β | 2.17 | 2 | m | 6.4, 7.6 | H—C(2), H—C(4) |
| 3'β | 2.25 | 1 | m | 4.8, 7.6, 14.0 | H—C(2'), H—C(3'α), H—C(4') |
| 4' | 2.42 | 2 | dd | 7.2, 7.6 | H—C(2'), H—C(3'α), H—C(3'β) |
| 4 | 2.54 | 2 | m | 6.8, 7.6, 8.4 | H—C(3α), H—C(3β) |
| 8'α | 2.97 | 1 | dd | 1.6, 14.4 | H—C(6'), H—C(8'β) |
| 8α | 2.99 | 1 | dd | 1.6, 14.4 | H—C(6), H—C(8β) |
| 8'β | 3.14 | 1 | dd | 5.2, 5.6, 14.4 | H—C(6'), H—C(8'α) |
| 8β | 3.19 | 1 | dd | 4.4, 14.4 | H—C(6), H—C(8α) |
| 2 | 3.84 | 1 | t | 6.4 | H—C(3α, 3β) |
| 2' | 4.38 | 1 | dd | 4.8, 9.2 | H—C(3'α, 3'β) |
| 6, 6' | 4.56 | 2 | m | 1.6, 4.4, 5.2, 5.6 | H—C(8α, 8'α), H—C(8β, 8'β) |
| 10, 10' | 5.87 | 2 | m | 6.4, 14.8 | H—C(9, 9'), H—C(11, 11') |
| 9, 9' | 5.98 | 2 | dd | 1.2, 14.8 | H—C(10, 10') |

[a]Arbitrary numbering of carbon atoms refers to structure in FIG. 3.
[b]The $^1$H chemical shifts are given in relation to TMSP.
[c]Determined from 1D-spectrum.
[d]Homonuclear $^1$H, $^1$H connectivities observed by g-COSY experiment.

A comparison of the $^{13}$C NMR spectrum showing 22 signals with the results of the DEPT-135 experiment exhibiting 18 signals as well as the gHSQC, revealed six signals corresponding to quarternary carbon atoms. Unequivocal assignment of these quarternary carbon atoms and the hydrogen-substituted carbon atoms, respectively, could be successfully achieved by means of HMBC spectroscopy optimized for $^2J_{C,H}$ and $^3J_{C,H}$ coupling constants and HSQC spectroscopy optimized for $^1J_{C,H}$ coupling constants, respectively. Additionally, the HMBC experiment revealed a correlation between the protons H—C(2', 6, 8αβ) and neighbouring carbon atom C(7), between the protons H—C(3, 4, 6) and neighbouring carbon atom C(5) as well as between the protons H—C(3', 4', 6') and neighbouring carbon atom C(5') thus demonstrating clearly the intramolecular linkage of the two cysteinyl and two γ-glutamyl moieties. Chemical shifts and heteronuclear $^1$H, $^{13}$C connectivity via $^1$J(C,H) and $^{2+3}$J(C,H) are summarized for all carbon atoms in Table 4, below.

TABLE 4

Assignment of $^{13}$C-NMR signals of γ-L-glutamyl-(E)-S-(propen-1-yl)-L-cysteinyl-α-L-glutamyl-γ-(E)-S-(propen-1-yl)-L-cysteine (400 MHz, D$_2$O)

| C atom[a] | δ[b] | DEPT[c] | heteronuclear $^1$H, $^{13}$C connectivity[d] | |
|---|---|---|---|---|
| | | | via $^1$J(C, H) | via $^{2,3}$J(C, H) |
| 11, 11' | 17.7 | CH$_3$ | 11, 11' | 9, 9', 10, 10' |
| 3 | 26.1 | CH$_2$ | 3αβ | 2, 4 |
| 3' | 26.8 | CH$_2$ | 3'αβ | 2', 4' |
| 4 | 31.3 | CH$_2$ | 4 | 2, 3 |
| 4' | 31.7 | CH$_2$ | 4' | 2', 3' |
| 8/8' | 33.9 | CH$_2$ | 8α, 8'α, 8β, 8'β | 6, 6', 9, 9' |
| 8'/8 | 34.1 | CH$_2$ | 8α, 8'α, 8β, 8'β | 6, 6', 9, 9' |
| 2' | 52.7 | CH | 2' | 3'α, 3'β, 4' |
| 6/6' | 53.2 | CH | 6, 6' | 8α/8'α, 8β/8'β |
| 6'/6 | 54.4 | CH | 6, 6' | 8α/8'α, 8β/8'β |
| 2 | 53.8 | CH | 2 | 3, 4 |
| 9/9' | 120.9 | CH | 9, 9' | 8α/8'α, 8β/8'β, 10, 10', 11, 11' |
| 9'/9 | 121.1 | CH | 9, 9' | 8α/8'α, 8β/8'β, 10, 10', 11, 11' |
| 10/10' | 130.7 | CH | 10, 10' | 9, 9', 11, 11' |
| 10'/10 | 130.9 | CH | 10, 10' | 9, 9', 11, 11' |
| 7 | 172.1 | CO | — | 2', 6, 8α, 8β |
| 1 | 173.3 | COOH | — | 2, 3 |
| 5 | 174.6 | CO | — | 3, 4, 6 |
| 5' | 174.8 | CO | — | 3', 4', 6' |
| 1' | 175.0 | COOH | — | 2', 3' |
| 7' | 175.8 | COOH | — | 6', 8'α, 8'β |

[a]Arbitrary numbering of carbon atoms refers to structure in FIG. 3.
[b]The $^{13}$C chemical shifts are given in relation to TMSP.
[c]DEPT-135 spectroscopy and g-HSQC.
[d]Assignments based on HSQC ($^1$J) und HMBC ($^{2,3}$J) experiments.

To confirm the structure, more precisely the intramolecular linkage of the tetrapeptide, as well as the configuration of the amino acids, enzymatic degradation with carboxypeptidase A and γ-glutamyltranspeptidase was performed. The C-terminus of the tetrapeptide could be substantiated as S-trans-(propen-1-yl)-L-cysteine, because after 48 h of treatment with Carboxypeptidase A, the two expected degradation products, namely the tripeptide γ-L-glutamyl-S-trans-(propen-1-yl)-L-cysteinyl-L-glutamic acid and S-trans-(propen-1-yl)-L-cysteine could be clearly determined by HPLC.

Figure 4:
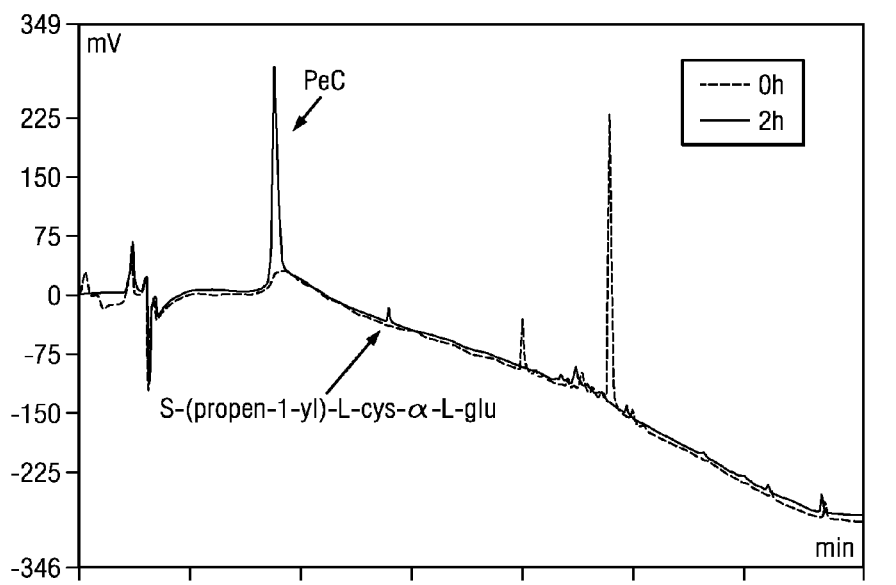

Additionally, enzymatic degradation with γ-glutamyltranspeptidase revealed the expected liberation of two amino acids L-glutamic acid and S-trans-(propen-1-yl)-L-cysteine, as well as the dipeptide S-trans-(propen-1-yl)-L-cysteinyl-α-L-glutamic acid, as seen in FIG. 4, which decompose when the reaction time was lengthened into the two corresponding amino acids, which could be clearly determined by HPLC, and cochromatography with the reference compounds.

Figure 5:
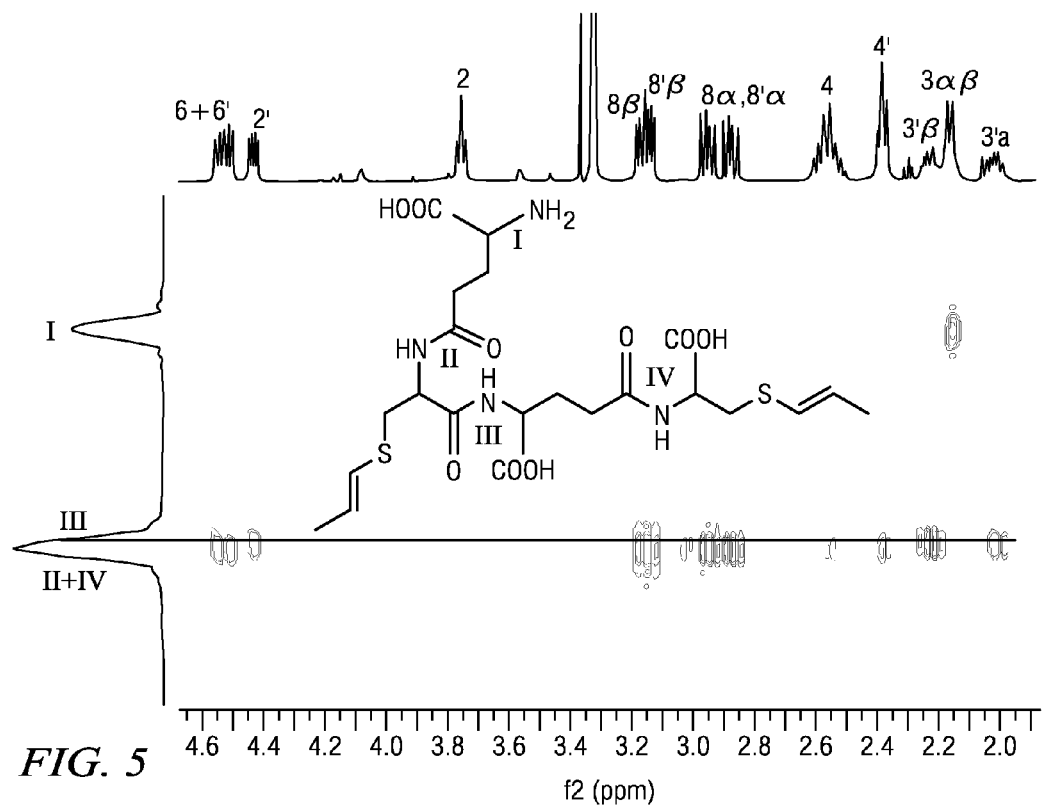
FIG. 5 depicts the $^{15}$N-HMBC spectrum of the tetrapeptide according to formula (II).

Further, as shown in FIG. 5, the $^{15}$N-HMBC spectrum of the identified tetrapeptide revealed the expected couplings of the nitrogen (I) of the N-terminus with the protons H—C (3αβ) and the couplings of the protons H—C(6, 2', 3'4) with the nitrogen III. The signals for the nitrogens II and IV are overlapped (not dispersed), but showing the expected couplings with the corresponding protons.

The isolated di-γ-glutamyl tetrapeptide is structurally unique because it contains two S-(propen-1-yl)-L-cysteine and two L-glutamic acid, respectively. Both S-(propen-1-yl)-L-cysteine are connected through a γ-peptide bond to L-glutamic acid and forming two dipeptides γ-L-glutamyl-(E)-S-1-propenyl-L-cysteine, which are linked through an α-peptide bond to each other.

Generation of the Amadori Reaction Products

Within the framework of the present invention it is also envisioned to use the flavor enhancing compounds as raw materials for the synthesis of Amadori products. Thus, the present invention also relates to flavor enhancing compounds obtainable by subjecting one or more of the isolated peptides to a Maillard reaction with reducing sugars. For example, γ-L-glutamyl-5-trans-(propen-1-yl)-L-cysteine, S-allyl-cysteine, and compounds of formulae (a) and (b) were shown to provide a good kokumi sensation after undergoing an Amadori reaction.

As used herein, the term "sugar" refers to polyhydroxy-aldehyde or polyhydroxy-ketone compounds such as mono-, di-, oligo- and/or polysaccharides. Suitable reducing sugars to be reacted with the listed peptides are meant to include any sugar whose carbonyl group is available for the reaction with a primary or secondary amino group, that is to say that the carbonyl group is not involved in any glycosidic bond. For example, the sugar may be selected from the group comprising glyceraldehydes, erythrose, threose, ribose, arabinose, xylose, lyxose, allose, altrose, glucose, mannose, gulose, idose, galactose, talose, tetrulose, ribulose, xylulose, psicose, fructose, sorbose, tagatos, fucose, cellobiose, gentiobiose, isomaltose, lactose, lactulose, maltose, maltulose, melibiose, neohesperidose, nigerose, palatinose, rutinose, fucosidolactose, maltotriose, manninotriose, panose, maltotetraose, and stachyose. Mixtures thereof can also be used. In addition, all stereoisomeric forms of these sugars may be used.

The sequence of steps involved in the Maillard reaction is generally known and thus, one skilled in the art, armed with this disclosure, would recognize how to create the Amadori products of the second aspect of this invention. Briefly, the initial step involves a condensation reaction between a reducing sugar and primary amino acid. Loss of water from this molecule produces an imine that is able to cyclise, resulting in the formation of an N-glycoside (a sugar attached to an NR group). After formation of N-glycoside, the immonium ion is formed and then isomerizes, this reaction is called Amadori rearrangement and forms an Amadori compound. This

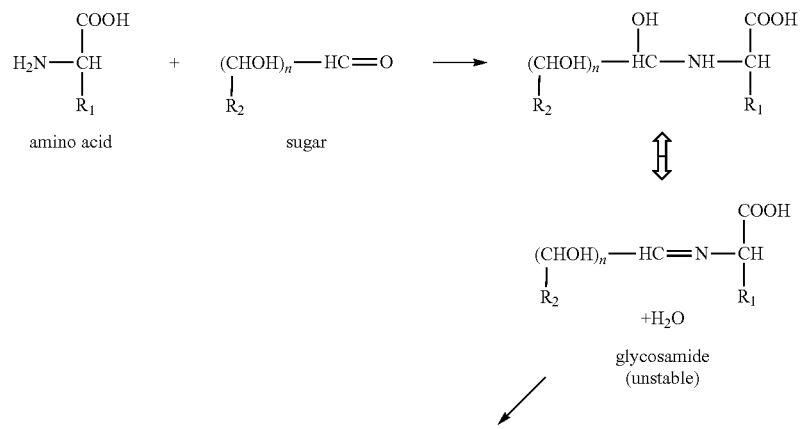

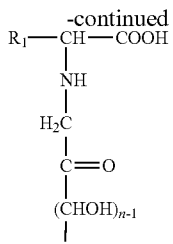

Amadori compound sequence may be represented as follows:

In general, the Amadori products of the present invention can be generated by refluxing in solvents or by roasting, pan-frying, for example. A reaction medium with low water content is favorable to bring about the required condensation with aldoses to glycosyl amines. Dilute aqueous solutions or mixtures of water with water-miscible solvents can also be used to carry out the Amadori reaction. Although the Amadori rearrangement proceeds at room temperature, it is preferred to accelerate it by heating. The preferred temperature depends on the solvents used and the reactant concentrations, but the temperature generally lies between about 40° C. to about 180° C. for about 5 minutes to about 2 days. At about 100° C. (refluxed), the preferred reaction time of the aqueous buffered reaction mixture is from about 30 minutes to about 10 hours, depending on the matrix used. For example, water and/or methanol or phosphate buffer of between 0.1 mmol/L to 1 mmol/L of $KH_2PO_4/K_2HPO_4$ were used for reaction times of between about 10 min to about 10 hours. During test runs, original seeds, crude extracts containing natural amounts of sugars, clean up extracts and single purified, synthesized or commercial available compounds were used to create Amadori reaction products useful for the present invention. Molar ratios of from about 1:1 to about 1:10 of a cysteine derivative: sugar were tested. However, mixtures of several compounds plus one or more reducing sugars can also be used to create the flavor enhancing compounds of the present invention. Because the shell protects reaction partners, higher temperatures and longer roasting conditions are necessary when using seeds when compared to the conditions suitable for pure compounds or extracts. For seeds, temperatures ranging from about 150 to about 250° C. are generally used for about 3 to about 60 minutes.

The Amadori compounds may then be purified by any means known in the art, including those examples discussed above in relation to other flavour enhancing compounds, to give the compounds in amorphous white powder forms. For example, the product may be purified by lyophilisation, followed by chromatographic work-up such as gel permeation chromatography. Chromatography may be performed, for example, with RP-HPLC (C-18, C-8, C-4, phenylhexyl) as stationary and water or 0.1% formic acid as mobile phase. The effluent can be monitored using an UV-detector at 220 nm. The product eluate can be confirmed by analytical methods well known in the art, for example by liquid chromatography and mass spectrometry (LC-MS) and nuclear magnetic resonance (NMR) spectroscopy. The following discussion of the identification is not meant to limit the scope of the invention, unless otherwise indicated.

Identification and Quantitative Analysis of Amadori Reaction Products

Powdered freeze-dried shallots, garlic as well as chive seeds (~500 mg, each) were roasted at 150° C. for 5, 10, 30 and 60 minutes. After cooling, 15 mL of aqueous methanol (1/1, v/v) was added and spiked with solutions of the internal standards $^{13}C_6$-ARP-S-allyl-L-cysteine and $^{13}C_6$-ARP-γ-L-glutamyl-(E)-S-1-propenyl-L-cysteine (100 μL, each) in aqueous methanol (14.4 mg/10 mL, 1/1, v/v) and the mixture was homogenized on a laboratory shaker for about 30 minutes. After filtration and rinsing with aqueous methanol (2.5 mL, 1/1, v/v), the solutions were diluted 1:10 with aqueous methanol and analyzed by means of LC-MS/MS on RP (Luna Phenyl hexyl column, 5 μm, available, for example, from PHENOMENEX®) in analytical scale (2×150 mm, flow rate 0.25 mL/min) using the conditions described below.

S-allyl-L-cysteine and γ-L-glutamyl-(E)-S-1-propenyl-L-cysteine were mixed with D-glucose (1:1 or 1:2; molar ratios), suspended in water (1 mL), then dried in an open vial at 50° C. for about 30 minutes, and, finally, roasted for 5, 10, 30 and 60 minutes at 150° C. The mixtures were taken up in a methanol/water mixture (1:1, v/v; 10 mL) and spiked with solutions of the internal standards $^{13}C_6$-ARP (100 μL, each) in aqueous methanol (14.4 mg/10 mL, 1/1, v/v) and the mixture was homogenized on a laboratory shaker for about 30 minutes. After filtration and rinsing with aqueous methanol (2×2.5 mL, 1/1, v/v), the solutions were diluted 1:10 with aqueous methanol and analyzed by means of LC-MS/MS on RP (Luna Phenyl hexyl, 5 μm) in analytical scale (2×150 mm, flow rate 0.25 mL/min) using the conditions described below.

The $^{13}C$-labelled standards and the analytes were mixed in five molar ratios from 0.1 to 10. After LC-MS/MS analysis, calibration curves were prepared by plotting peak area ratios of analyte to internal standard against concentration ratios of each analyte to the internal standard using linear regression. The equations obtained were used for calculations of the concentrations of analytes.

For (LC/MS)-ESI-MS/MS, ESI mass and product ion spectra were acquired on an API 4000 Qtrap® mass spectrometer (Applied Biosystems, Darmstadt, Germany) with direct flow infusion. For ESI, the ion spray voltage was set at −4500 V in the negative mode and at +5500 V in the positive mode. Nitrogen served as curtain gas (20 psi), the declustering potential, being the accelerating current from atmospheric pressure into high vacuum, was set to dependent compound values, which are summarized in tables below. The mass spectrometer was operated in the full-scan mode detecting positive or negative ions. The MS/MS parameters were dependent on the substances, detecting the fragmentation of the $[M-H]^-$ or $[M+H]^+$ molecular ions into specific product ions after collision with nitrogen as collision gas ($4\times10^{-5}$ torr). The collision energies are given below.

For HPLC-ESI-MS/MS analysis, an Agilent 1200 series HPLC was linked to the mass spectrometer. Data acquisition was carried out with the Analyst 1.42 software (Applied Biosystems). Chromatographic separation was performed using a linear binary gradient. The injection volume was 5 μL, the flow rate was 250 µL/min. For HPLC-MS/MS, the mass spectrometer was operated in the multiple reaction monitoring (MRM) mode, detecting in dependence from the described method below negative or positive ions. Zero-grade air served as nebulizer gas (45 psi), and, heated at 425° C., as turbo gas for solvent drying (55 psi). The Amadori reaction products were detected in positive electrospray ionization (ESI+).

Starting with a mixture (95/5, v/v) of aqueous formic acid (0.1%, pH 2.5) and methanol (formic acid 0.1%), held for 5 minutes, the methanol content was increased to 100% in 15 min, and, finally, held at 100% for 10 minutes. The flow rate was set to 250 µL/min. By means of the multiple reaction monitoring (MRM+) mode, the individual Amadori reaction products were analyzed on Luna Phenylhexyl (5 µm, Phenomenex) using the following transition reactions in Table 5 monitored for a duration of 111 ms, respectively.

TABLE 5

Declustering potential (DP), entrance potential (EP), collision energy (CE) and collision exit potential (CXP) of several individual Amadori reaction products.

|  | m/z | m/z | DP(V) | EP(V) | CE(V) | CXP(V) |
|---|---|---|---|---|---|---|
| $^{13}C_6$-ARP-γ-Glu-Pec | 459.2→ | 374.2 | 61 | 10 | 25 | 14 |
| $^{13}C_6$-ARP-γ-Glu-Pec | 459.2→ | 144.9 | 61 | 10 | 45 | 12 |
| ARP-γ-Glu-Pec | 453.2→ | 369.2 | 56 | 10 | 23 | 14 |
| ARP-γ-Glu-Pec | 453.2→ | 145.0 | 56 | 10 | 43 | 10 |
| $^{13}C_6$-ARP-S-allyl-cys | 330.1→ | 145.0 | 46 | 10 | 29 | 12 |
| $^{13}C_6$-ARP-S-allyl-cys | 330.1→ | 73.0 | 46 | 10 | 45 | 4 |
| ARP-S-allyl-cys | 324.1→ | 145.0 | 46 | 10 | 27 | 14 |
| ARP-S-allyl-cys | 324.1→ | 73.0 | 46 | 10 | 37 | 4 |

Example Syntheses and Analysis of Amadori Reaction Products: N-(1-Deoxy-D-fructos-1-yl)-S-allyl-L-cysteine and N-(1-Deoxy-D-fructos-1-yl)-γ-L-glutamyl-(E)-S-1-propenyl-L-cysteine S-allyl-cysteine (3.1 mmol) and D-glucose (6.2 mmol) were suspended in a mixture of methanol and isopropanol (3/1, v/v, 300 mL). The suspensions were refluxed for about 10 hours at 100° C. while stirring. Similarly, γ-L-glutamyl-(E)-S-1-propenyl-L-cysteine (1.7 mmol) and D-glucose (16.6 mmol) were suspended in a mixture of methanol and isopropanol (3/1, v/v, 300 mL), and the suspensions were refluxed for 10 h at 100° C. while stirring. The $^{13}C$ labelled Amadori reaction products were obtained in a similar manner. After cooling the reaction mixture to ambient temperature, the volume was reduced to dryness under vacuum. After purification by means of RP-18 column chromatography, and lyophilisation, the target compounds were obtained as white powders in purities of more than 98%. A Thermo Hypersil C-18 column was used (250×21.1 mm; 220 nm) with a flow rate of 20 mL/min. The mobile phases were 0.1% HCOOH (A) and ACN (B), with a column washing with ACN. For ARP-S-allyl-Cys, the elution condition was 15 minutes with A. For γ-L-Glutamyl-5-trans-(propen-1-yl)-L-cysteine (γ-Glu-trans-PeC), 3 minutes with A, in 20 minutes to 18% B.

Figure 6:
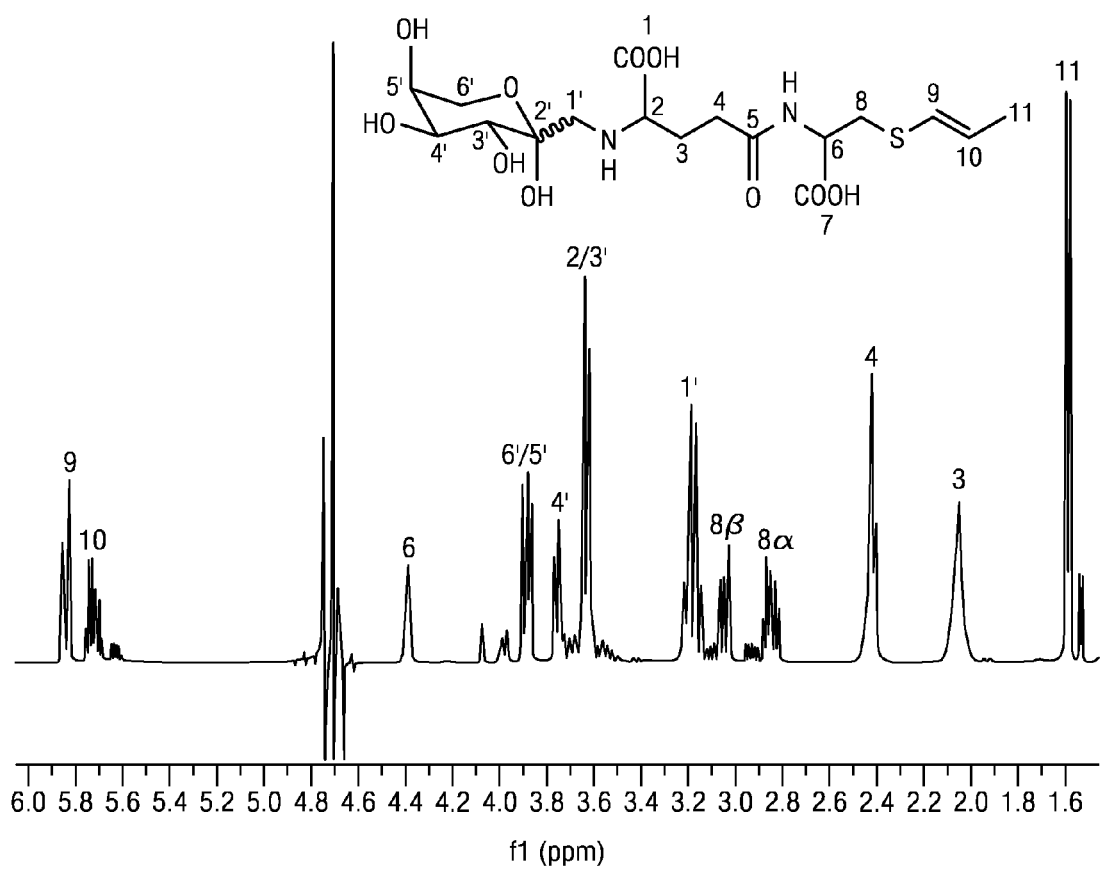
FIG. 6 depicts the $^1$H NMR spectrum of N-(1-Deoxy-D-fructos-1-yl)-γ-L-glutamyl-(E)-S-1-propenyl-L-cysteine.
Figure 7A:
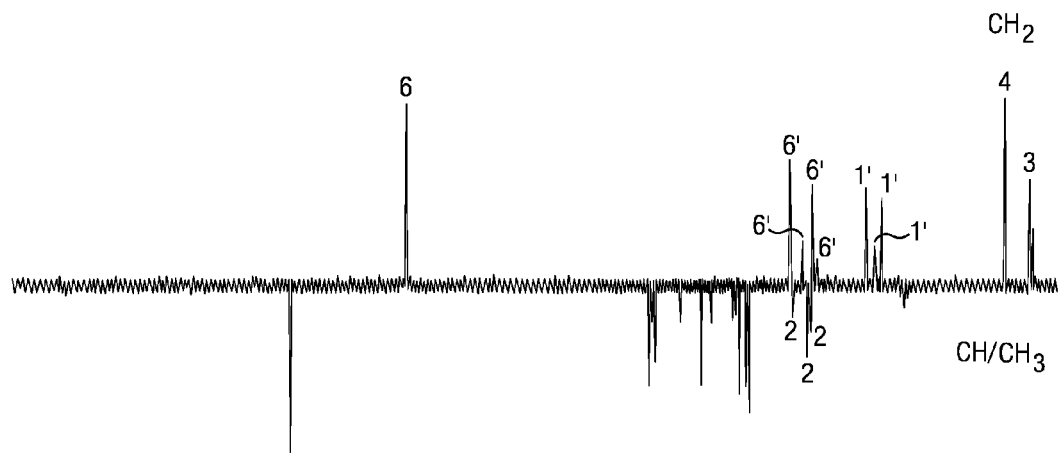
FIG. 7 depicts the (A) DEPT-135 and (B) $^{13}$C NMR spectrum of N-(1-Deoxy-D-fructos-1-yl)-S-allyl-L-cysteine (MeOD, 400 MHz).
Figure 7B:
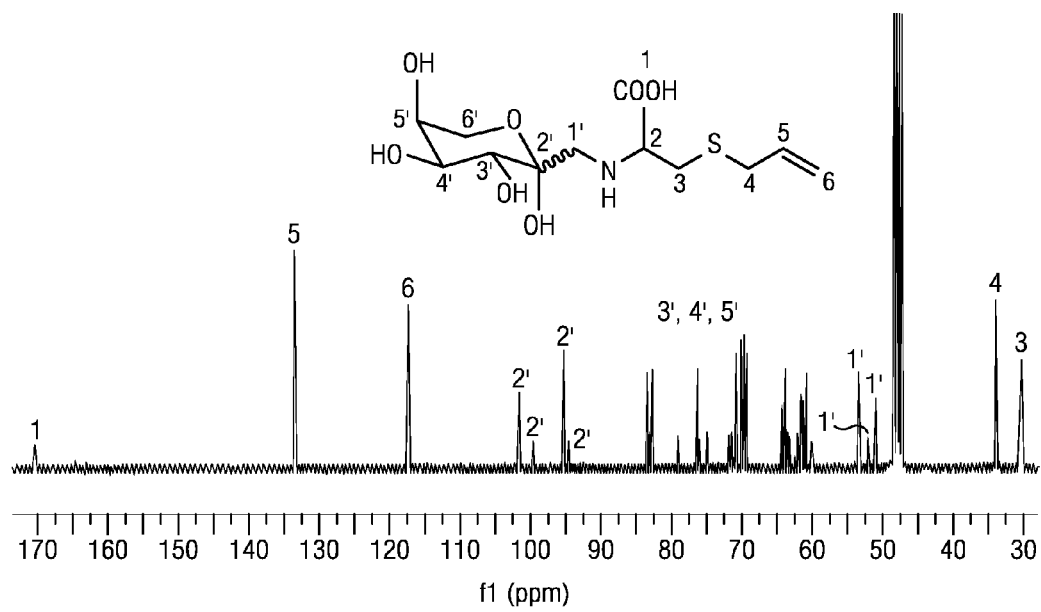

FIGS. 6 and 7 indicate the $^1H$ and $^{13}C$ NMR spectra for the N-(1-Deoxy-D-fructos-1-yl)-γ-L-glutamyl-(E)-S-1-propenyl-L-cysteine and N-(1-Deoxy-D-fructos-1-yl)-S-allyl-L-cysteine compounds, respectively. Two isomers were detected via $^1H$- and $^{13}C$-NMR-spectroscopy for N-(1-Deoxy-D-fructos-1-yl)-γ-L-glutamyl-(E)-S-1-propenyl-L-cysteine, whereas the main isomer (ratio determined via $^1H$ NMR: 6.5/1) could be clearly identified as the pyranose form. Four isomers determined via $^{13}C$ NMR were formed upon this reaction for N-(1-Deoxy-D-fructos-1-yl)-S-allyl-L-cysteine, whereas the main isomer could be clearly identified as the pyranose form, as seen in FIG. 7.

With regard to FIG. 6, the reaction products showed the typical UV/Vis absorption maxima expected for S-alkenyl-cysteines, and showed a pseudomolecular ion [M–H]$^-$ ion with m/z 451 as well as the fragment ion m/z 128 in the MS-ESI$^-$ spectrum. High resolution LC-MS (ESI$^-$) analysis confirmed the compound to have the molecular formula $C_{17}H_{28}N_2O_{10}S$. The $^1H$ NMR showed the typical signals expected for the dipeptide γ-L-glutamyl-(E)-S-1-propenyl-L-cysteine. Additionally, five further signals could be observed. The protons H—C(1'α) at 3.16 ppm and H—C(1'β) at 3.20 ppm could be observed as doublets with a coupling constant of 12.8 Hz. The proton sequence within each spin system was elucidated by the series of cross-signals in the g-COSY spectrum. The proton H—C(4') resonating as dd at 3.76 ppm shows coupling constants of 3.3 and 9.8 Hz, as seen in Table 6, below. The coupling constant of 9.8 Hz resulting from the axial-axial coupling to the proton H—C(3') at 3.62 ppm, whereas the small coupling constant of 3.3 Hz could be deduced from the axial-equatorial coupling to the proton H—C(5') at 3.87 ppm.

TABLE 6

Assignment of $^1H$ NMR signals of N-(1-Deoxy-D-fructos-1-yl)-γ-L-glutamyl-S-trans-(propen-1-yl)-L-cysteine (ARP-γ-trans-Glu-PeC) (500 MHz, D$_2$O)

| H at relevant C atom [a] | δ [ppm] [b] | I [c] | M [c] | J(Hz) [c] | homonuclear $^1H$, $^1H$ connectivity [d] |
|---|---|---|---|---|---|
| 11 | 1.56 | 3 | d | 6.6 | H—C(9), H—C(10) |
| 3 | 2.06 | 2 | m | 7.0, 7.3, 7.4, 7.6 | H—C(2), H—C(4) |
| 4 | 2.42 | 2 | pt | 7.1, 7.2 | H—C(3) |
| 8α | 2.85 | 1 | dd | 8.3, 14.3 | H—C(8β), H—C(6) |
| 8β | 3.04 | 1 | dd | 4.3, 14.3 | H—C(8α), H—C(6) |
| 1'α | 3.16 | 1 | d | 12.8 | H—C(1'β) |
| 1'β | 3.20 | 1 | d | 12.8 | H—C(1'α) |
| 3' | 3.62 | 1 | d | 9.7 | H—C(4') |
| 2 | 3.64 | 1 | t | — | H—C(3) |
| 4' | 3.76 | 1 | dd | 3.3, 9.8 | H—C(3'), H—C(5') |
| 5' | 3.87 | 1 | m | 3.4 | H—C(4'), H—C(6') |
| 6α, β' | 3.89 | 2 | d | 12.7 | H—C(5'), H—C(6αβ') |
| 6 | 4.39 | 1 | dd | 4.4, 8.1 | H—C(8α), H—C(8β) |
| 10 | 5.72 | 1 | m | 6.6, 14.4 | H—C(9), H—C(11) |
| 9 | 5.84 | 1 | dd | 0.7, 14.0 | H—C(10), H—C(11) |

[a] Arbitrary numbering of carbon atoms refers to structure in FIG. 6.
[b] The $^1H$ chemical shifts are given in relation to D$_2$O.
[c] Determined from 1D spectrum.
[d] Homonuclear $^1H$, $^1H$ connectivities observed by a g-COSY experiment.

A comparison of the $^{13}C$ NMR spectrum showing 17 signals with the results of the DEPT-135 experiment exhibiting 13 signals, revealed four signals corresponding to quarternary carbon atoms. Unequivocal assignment of these quarternary carbon atoms and the hydrogen-substituted carbon atoms, respectively, could be successfully achieved by means of HMBC spectroscopy optimized for $^2J_{C,H}$ and $^3J_{C,H}$ coupling constants and HSQC spectroscopy optimized for $^1J_{C,H}$ coupling constants, respectively, as shown in Table 7. Additionally, the HMBC experiment revealed a correlation between the sugar proton H—C(3') resonating at 3.62 ppm as well as the alpha proton of the L-glutamic acid moiety H—C(2) at 3.64 ppm and neighbouring carbon atom C(1') at 52.5 ppm, thus demonstrating clearly the intramolecular linkage of the sugar to the dipeptide moiety.

TABLE 7

Assignment of $^{13}$C NMR signals of N-(1-Deoxy-D-fructos-1-yl)-γ-L-glutamyl-S-trans-(propen-1-yl)-L-cysteine (ARP-γ-trans-Glu-PeC) (125 MHz, D$_2$O)

| | | | heteronuclear $^1$H, $^{13}$C connectivity[d] | |
|---|---|---|---|---|
| C atom[a] | δ [ppm][b] | DEPT[c] | via $^1$J(C, H) | via $^{2,3}$J(C, H) |
| 11 | 17.6 | CH$_3$ | 11 | 9, 10 |
| 3 | 24.9 | CH$_2$ | 3 | 2, 4 |
| 4 | 31.6 | CH$_2$ | 4 | 2, 3 |
| 8 | 33.9 | CH$_2$ | 8 | 9, 6 |
| 1' | 52.5 | CH$_2$ | 1' | 2, 3' |
| 6 | 53.5 | CH | 6 | 8α, 8β |
| 2 | 62.3 | CH | 2 | 3, 4, 1' |
| 6' | 63.8 | CH$_2$ | 6' | 4' |
| 5' | 68.8 | CH | 5' | 3', 6', 4' |
| 4' | 69.2 | CH | 4' | 3', 5', 6' |
| 3' | 69.8 | CH | 3' | 1', 4', 5' |
| 2' | 95.2 | C | — | 1', 3', 6' |
| 9 | 121.0 | CH | 9 | 11, 10, 8α, 8β |
| 10 | 130.5 | CH | 10 | 11, 9 |
| 1 | 172.5 | COOH | — | 2 |
| 5 | 174.6 | CO | — | 3, 4, 6 |
| 7 | 175.0 | COOH | — | 6, 8 |

[a]Arbitrary numbering of carbon atoms refers to structure in FIG. 7.
[b]The $^{13}$C chemical shifts are given in relation to TMSP.
[c]DEPT-135 spectroscopy.
[d]Assignments based on HSQC ($^1$J) and HMBC ($^{2,3}$J) experiments.

Figure 8:
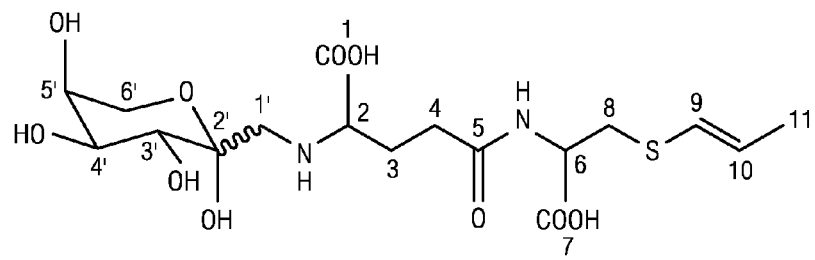
FIG. 8 indicates the structure of the Amadori product of γ-L-Glutamyl-5-trans-(prop en-1-yl)-L-cysteine.

In addition, a heteronuclear $^3$J coupling between the sugar proton H—C(1'αβ) resonating at 3.16 ppm and the carbon atom C(2) at 62.3 ppm of the L-glutamic acid moiety could be detected, thus also demonstrating the intramolecular linkage of carbohydrate with the dipeptide. Furthermore, the chemical shifts of the carbon atoms C(1') and C(2') resonating at 52.5 and 95.2 ppm undoubtedly confirmed the linkage to the sugar moiety. FIG. 8 indicates the structure of the N-(1-Deoxy-D-fructos-1-yl)-γ-L-Glutamyl-5-trans-(propen-1-yl)-L-cysteine, the Amadori product of γ-L-Glutamyl-S-trans-(propen-1-yl)-L-cysteine.

Referring now to FIG. 7, the reaction products showed the typical UV/Vis absorption maxima expected for S-alkenyl-cysteines, and showed a pseudomolecular ion [M+H]$^+$ ion with m/z 324 as well as the fragment ion m/z 162 in the MS-ESI$^-$ spectrum. High resolution LC-MS (ESI$^-$) analysis confirmed the compound to have the molecular formula C$_{12}$H$_{21}$NO$_7$S. The $^1$H NMR showed the typical signals expected for the S-allyl-L-cysteine. Additionally, five further signals could be observed. The protons H—C(1'αβ) in the range of 3.26-3.47 ppm could be observed as several doublets with a coupling constant of 12.8 Hz, as seen in Table 8. The proton sequence within each spin system was elucidated by the series of cross-signals in the g-COSY spectrum. The remaining protons H—C(3',4',5',6') of the carbohydrate moiety were detected in the range of 3.62-4.13 ppm.

TABLE 8

Assignment of $^1$H NMR signals of N-(1-Deoxy-D-fructos-1-yl)-S-allyl-L-cysteine (ARP-S-allyl-L-cysteine) (400 MHz, MeOD)

| H at relevant C atom[a] | δ [ppm][b] | I[c] | M[c] | J(Hz)[c] | homonuclear $^1$H, H connectivity[d] |
|---|---|---|---|---|---|
| 3α | 2.89-3.00 | 1 | 4xdd | 7.6, 14.8 | H—C(2), H—C(3β) |
| 3β | 3.13-3.20 | 1 | 4xdd | 4.5, 7.5, 14.8 | H—C(2), H—C(3α) |
| 4 | 3.24 | 2 | d | 7.0 | H—C(5) |
| 1'αβ | 3.26-3.47 | 2 | 8xd | 12.8 | H—C(1'αβ) |
| 3', 4', 5', 6' | 3.62-4.13 | 5 | m | — | within the sugar |
| 2 | 3.83 | 1 | m | 4.5 | H—C(3αβ) |
| 6α | 5.14 | 1 | d | 10.0 | H—C(5), H—C(6β) |
| 6β | 5.24 | 1 | d | 17.0 | H—C(5), H—C(6α) |
| 5 | 5.77-5.88 | 1 | m | 7.1, 10.0, 17.0 | H—C(9), H—C(11) |

[a] Arbitrary numbering of carbon atoms refers to structure in FIG. 7.
[b] The $^1$H chemical shifts are given in relation to D$_2$O.
[c] Determined from 1D spectrum.
[d] Homonuclear $^1$H, $^1$H connectivities observed by a g-COSY experiment.

A comparison of the $^{13}$C NMR spectrum (FIG. 7) showing 12 signals with the results of the DEPT-135 experiment exhibiting 10 signals, revealed two signals corresponding to quarternary carbon atoms. Unequivocal assignment of these quarternary carbon atoms and the hydrogen-substituted carbon atoms, respectively, could be successfully achieved by means of heteronuclear multiple bond correlation spectroscopy (HMBC) optimized for $^2J_{C,H}$ and $^3J_{C,H}$ coupling constants and heteronuclear single-quantum correlation spectroscopy (HSQC) optimized for $^1J_{C,H}$ coupling constants, respectively (Table 9).

TABLE 9

Assignment of $^{13}$C NMR signals of N-(1-Deoxy-D-fructos-1-yl)-S-allyl-L-cysteine (ARP-S-allyl-cys) (100 MHz, MeOD)

| | | | heteronuclear $^1$H, $^{13}$C connectivity[d] | |
|---|---|---|---|---|
| C atom[a] | δ [ppm][b] | DEPT[c] | via $^1$J(C, H) | via $^{2,3}$J(C, H) |
| 3 | 31.74, 31.80, 31.85, 31.91 | CH$_2$ | 3 | 2, 4 |
| 4 | 35.18, 35.27, 35.29, 35.34 | CH$_2$ | 4 | 2, 3αβ, 5, 6 |
| 1' | 52.70, 53.39, 53.42, 54.67 | CH$_2$ | 1' | 2, 3' |
| 6' | 61.47, 62.29 | CH$_2$ | 6' | 4' |
| 2 | 62.51, 62.57, 62.86 | CH | 2 | 3αβ, 1' |
| 6' | 63.53 | CH$_2$ | 6' | 4' |
| 2 | 64.83 | CH | 2 | 3αβ, 1' |
| 6' | 65.36 | CH$_2$ | 6' | 4' |

TABLE 9-continued

Assignment of $^{13}$C NMR signals of N-(1-Deoxy-D-fructos-1-yl)-S-allyl-L-cysteine (ARP-S-allyl-cys) (100 MHz, MeOD)

| | | | heteronuclear $^{1}$H, $^{13}$C connectivity[d] | |
|---|---|---|---|---|
| C atom[a] | δ [ppm][b] | DEPT[c] | via $^{1}$J(C, H) | via $^{2,3}$J(C, H) |
| 3', 4', 5' | 70.86, 71.31, 72.19, 72.91, 73.12, 76.41, 77.78, 80.58, 84.24, 84.37, 84.88 | CH | 3', 4', 5' | couplings within the carbohydrate moiety |
| 2' | 96.02, 96.78, 101.04, 103.03 | C | — | 1', 3', 6', 4' |
| 6 | 118.77, 118.82 | CH | 6 | 5, 4 |
| 5 | 134.97, 135.02 | CH | 5 | 4, 6 |
| 1 | 171.90, 171.97 | COOH | — | 2, 3αβ |

[a]Arbitrary numbering of carbon atoms refers to structure in FIG. 7.
[b]The $^{13}$C chemical shifts are given in relation to.
[c]DEPT-135 spectroscopy.
[d]Assignments based on HSQC ($^{1}$J) and HMBC ($^{2,3}$J) experiments.

Figure 9:
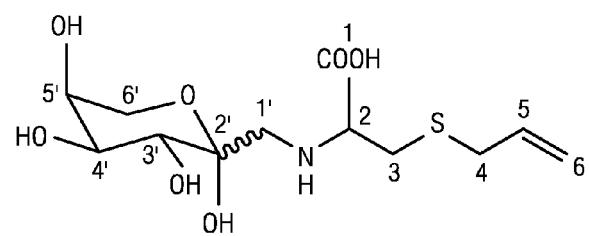
FIG. 9 indicates the structure of the Amadori product of S-allyl-L-cysteine.
Figure 10:
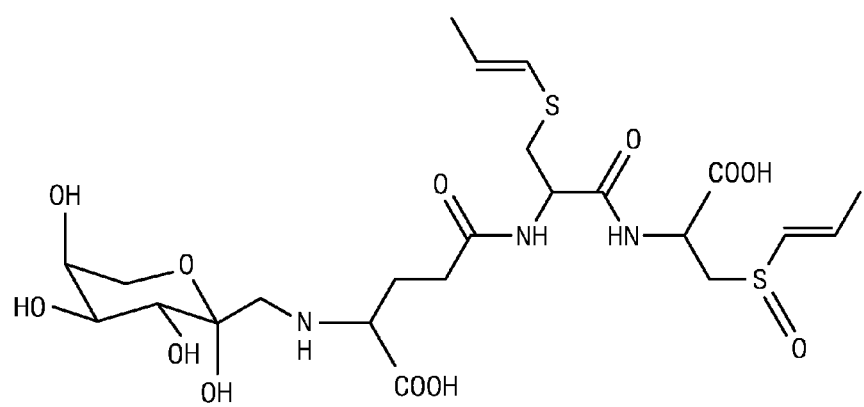
FIG. 10 indicates the structure of the Amadori product of the isolated tripeptide.

Additionally, the HMBC experiment revealed a correlation between the sugar proton H—C(3') as well as the alpha proton of the L-glutamic acid moiety H—C(2) and neighbouring carbon atom C(1') at 54.7 ppm, thus demonstrating clearly the intramolecular linkage of the sugar to the dipeptide moiety. In addition, a heteronuclear $^{3}$J coupling between the sugar protons H—C(1'αβ) resonating at 3.26-3.47 ppm and the carbon atoms C(2) at 62.5-62.9 ppm of the L-glutamic acid moiety could be detected, thus also demonstrating the intramolecular linkage of carbohydrate with the amino acid. Furthermore, the chemical shifts of the carbon atoms C(1') and C(2') resonating at 52.7-54.7 and 96.0-103.0 ppm undoubtedly confirmed the linkage to the sugar moiety. FIG. 9 depicts the structure of N-(1-Deoxy-D-fructos-1-yl)-S-allyl-L-cysteine, the Amadori product of S-allyl-L-cysteine.

The invention is further described with reference to the following non-limiting examples, which demonstrate the observed organoleptic effects of the peptides of the present invention.

Sensory Test Examples of Kokumi Intensities

Unless otherwise indicated, all sensory tests for the samples are determined using triangle tests (Wieser and Belitz, Z. Lebensm. Unters. Forsch., 1975, 159, 65-72) in three different sessions. The sensory panel is trained to evaluate aqueous solutions (2 mL each) of the following reference taste compounds dissolved in bottled water with a pH of 6.0: sucrose (25 mmol/L) for sweet taste; lactic acid (20 mmol/L) for sour taste; NaCl (30 mmol/L) for salty taste; caffeine (1 mmol/L) for bitter taste; and MSG (3 mmol/L) for umami taste, tannic acid (0.05%) for puckering astringency, and quercetin-O-β-D-glucopyranoside (0.01 mmol/L) for a velvety astringent, mouth-drying oral sensation. For the training of viscosity, a gelatin solution (0.5% in water) was used. For the training of the activity of mouthfulness enhancement and complexity increase (kokumi activity), the panel was asked to compare the gustatory impact of the blank model chicken broth (control) with a solution of reduced glutathione (5 mmol/L) in chicken broth (both at pH 6.5). Sensory analyses were performed in a sensory panel room at 19-22° C. in three different sessions using nose clamps.

To determine the recognition threshold concentrations for mouthfulness enhancement (kokumi) activity, a three-alternative forced-choice test was performed using aqueous solutions of sodium chloride (30 mmol/L) or L-glutamic acid (10 mmol/L), a binary mixture of sodium chloride (10 mmol/L) and L-glutamic acid (10 mmol/L), or the model chicken broth as an inducing composition matrix, respectively. The pH value of the individual samples and blanks was adjusted to 6.5 by adding trace amounts of formic acid (0.1 mmol/L) and sodium hydroxide solution (1.0 mmol/L), respectively. The samples (4 mL) were presented in serial 1:1 dilutions in order of increasing concentrations to the trained panel in three different sessions using the sip-and-spit method. At the start of each sensory session and before each trial, the subject rinsed with bottled water and expectorated. The samples were swirled in the mouth briefly and expectorated.

After indicating which vial contained the taste-modifying compound, the participant received another set of two samples without and one sample with an additive. To prevent excessive fatigue, tasting began at a concentration level two steps below the individual threshold concentration that had been determined in a preliminary sensory experiment. The geometric mean of the last and the second last concentration was calculated and taken as the individual threshold. The threshold value of the sensory panel was approximated by averaging the threshold values of the individuals in three independent sessions. Values between individuals and separate sessions differed not more than two dilution steps.

For recording the taste profiles, samples are prepared as indicated in the examples below. Flavor profiles of samples are determined in a triangle test in three different sessions. Panelists refrain from eating or drinking for at least 1 hour prior to the session. At the start of the session and before each trial, the subjects rinsed with water and expectorated. The participants receive a set of two blanks and one taste sample. Liquids are swirled around in the mouth briefly and expectorated. After indicating which glass vial shows a different taste and/or flavor profile and description of the distinction, the participant receives another trial set of two blanks and one taste sample. Each sample with additive is compared to two reference samples without additives. Kokumi intensity is rated according to a scale from 0 to 5 (with 5 being the most intensive). Punch refers to an initial kokumi sensation experienced in the mouth within 0-3 seconds from the time when a food or liquid is put in the mouth, while long-lasting refers to kokumi felt after 10-60 seconds therefrom.

EXAMPLE 1

Sensory Effects of the Compounds in Chicken Broth

Sensory (triangle) tests are performed by dilution of 3 grams of chicken broth concentrate (Gourmet Bouillon Huhn; Maggi, Singen, Germany) with 100 mL water (Evian®). Additives are added as specified in table below. The pH-value of all samples is adjusted to 6.5 using formic acid (0.1 mol/L) or sodium hydroxide (0.1 mol/L). Glutathione (GSH) was determined to have a kokumi intensity of 3.5 in all tests. The results of the tests are indicated in Table 10, below. For each sample, kokumi intensity is rated and panelists were asked to describe sensory characteristics.

TABLE 10

Sensory effects in chicken broth

| Chicken broth samples | Concentration of additive | Kokumi intensity (0-5) | Sensory descriptors |
|---|---|---|---|
| Negative control (without additives) | — | 2 | — |
| Positive control: NaCl | 30 mmol/L | 2 | increased salty taste |
| Positive control: MSG (mono sodium glutamate) | 10 mmol/L | 2 | increased umami |
| GSH, reduced form [γ-Glu-Cys-Gly] | 10 mmol/L | 3.5 | increased complexity and mouthfulness, more rich, more impact, punch |
| S-methyl-L-cysteine | 10 mmol/L | 2.4 | slight increase of complexity and mouthfulness, long lasting |
| S-ethyl-L-cysteine | 10 mmol/L | 2.7 | increase of complexity and mouthfulness, more impact, punch, slightly sweeter |
| S-propyl-L-cysteine | 10 mmol/L | 3.5 | increase of complexity and mouthfulness, more impact, punch, slightly bitter |
| S-propyl-L-cysteine | 5 mmol/L | 3.5 | increase of complexity and mouthfulness, more impact, punch, no bitterness |
| (Z)-S-1-propenyl-L-cysteine S-(E-prop-1-enyl)-cysteine [(E)-S-1-propenyl-cysteine] | 10 mmol/L | 3.1 | increase of complexity and mouthfulness, more impact, punch |
| (Z)-S-1-propenyl-L-cysteine | 5 mmol/L | 3.1 | increase of complexity and mouthfulness, more impact, punch |
| S-allyl-L-cysteine | 10 mmol/L | 3.3 | increase of complexity and mouthfulness, more impact, punch, old garlic |
| (E)-S-1-propenyl-L-cysteine S-(E-prop-1-enyl)-cysteine [(E)-S-1-propenyl-cysteine] | 10 mmol/L | 2.5 | slight increase of complexity and mouthfulness |
| S-methyl-L-cysteine-(±)-SO | 10 mmol/L | 2.1 | slight increase of complexity and mouthfulness |
| S-ethyl-L-cysteine-(±)-SO | 10 mmol/L | 2.1 | slight increase of complexity and mouthfulness |
| S-propyl-L-cysteine-(±)-SO | 10 mmol/L | 2.3 | slight increase of complexity and mouthfulness, slightly bitter |
| S-propyl-L-cysteine-(±)-SO | 5 mmol/L | 2.3 | slight increase of complexity and mouthfulness |
| (Z)-S-1-propenyl-L-cysteine-(±)-SO | 10 mmol/L | 2.2 | slight increase of complexity and mouthfulness |
| S-allyl-L-cysteine-(±)-SO | 10 mmol/L | 2.4 | increase of complexity and mouthfulness |
| Alliin [S-allyl-L-cysteine-(+)-SO] | 10 mmol | 2.5 | increase of complexity and mouthfulness |
| (E)-S-1-propenyl-L-cysteine-(±)-SO | 10 mmol/L | 2.2 | slight increase of complexity and mouthfulness |
| γ-L-glutamyl-S-methyl-L-cysteine | 10 mmol/L | 3.5 | increase of complexity and mouthfulness, more impact, punch |
| γ-L-glutamyl-S-ethyl-L-cysteine | 10 mmol/L | 3.1 | increase of complexity and mouthfulness, more impact, punch |
| γ-L-glutamyl-S-propyl-L-cysteine | 10 mmol/L | 2.8 | increase of complexity and mouthfulness, more impact, punch |

TABLE 10-continued

Sensory effects in chicken broth

| Chicken broth samples | Concentration of additive | Kokumi intensity (0-5) | Sensory descriptors |
|---|---|---|---|
| γ-L-glutamyl-S-allyl-L-cysteine | 10 mmol/L | 3.7 | increase of complexity and mouthfulness, more impact, punch |
| γ-L-glutamyl-(E)-S-1-propenyl-L-cysteine | 10 mmol/L | 3.3 | increase of complexity and mouthfulness, more impact, punch |
| γ-L-glutamyl-S-methyl-L-cysteine-(±)-SO | 10 mmol/L | 2.5 | increase of complexity and mouthfulness, more impact, punch |
| γ-L-glutamyl-S-ethyl-L-cysteine-(±)-SO | 10 mmol/L | 2.2 | slight increase of complexity and mouthfulness, more impact, punch |
| γ-L-glutamyl-S-propyl-L-cysteine-(±)-SO | 10 mmol/L | 2.1 | slight increase of complexity and mouthfulness, more impact, punch |
| γ-L-glutamyl-S-allyl-L-cysteine-(±)-SO | 10 mmol/L | 2.5 | increase of complexity and mouthfulness, more impact, punch |
| γ-L-glutamyl-(E)-S-1-propenyl-L-cysteine-(±)-SO | 10 mmol/L | 2.5 | increase of complexity and mouthfulness, more impact, punch |
| S-methyl-glutathione [S-methyl-GSH] [S-methyl-γ-L-Glu-L-Cys-Gly] | 10 mmol/L | 2.8 | increase of complexity and mouthfulness, more impact, punch |
| S-ethyl-GSH [S-ethyl-γ-L-Glu-L-Cys-Gly] | 10 mmol/L | 2.3 | slight increase of complexity and mouthfulness, more impact, punch |
| S-propyl-GSH [S-propyl-γ-L-Glu-L-Cys-Gly] | 10 mmol/L | 2.1 | slight increase of complexity and mouthfulness, more impact, punch |
| S-allyl-GSH [S-allyl-γ-L-Glu-L-Cys-Gly] | 10 mmol/L | 3.2 | increase of complexity and mouthfulness, more impact, punch |
| S-methyl-GSH-(±)-SO [S-methyl-γ-L-Glu-L-Cys-(±)-SO-Gly] | 10 mmol/L | 2 | same intensity as blank |
| S-ethyl-GSH-(±)-SO [S-ethyl-γ-L-Glu-L-Cys-(±)-SO-Gly] | 10 mmol/L | 2 | same intensity as blank |
| S-propyl-GSH-(±)-SO [S-propyl-γ-L-Glu-L-Cys-(±)-SO-Gly] | 10 mmol/L | 2 | same intensity as blank |
| S-allyl-GSH-(±)-SO [S-allyl-γ-L-Glu-L-Cys-(±)-SO-Gly] | 10 mmol/L | 2.8 | increase of complexity and mouthfulness, more impact, punch |
| γ-L-glutamyl-(E)-S-1-propenyl-L-cysteinyl-S-1-propenyl-L-cysteine-(+/−)-SO [γ-L-Glu-L-Cys-L-Cys-(+/−)-SO] | 5 mmol/L | 4.5 | strong increase of complexity and mouthfulness, more impact, punch, long lasting |
| γ-L-glutamyl-(E)-S-1-propenyl-L-cysteinyl-γ-L-glutamyl-(E)-S-1-propenyl-L-cysteine [γ-L-Glu-L-Cys-γ-L-Glu-L-Cys] | 10 mmol/L | 3.3 | increase of complexity and mouthfulness, more impact, punch, long lasting |
| N-(1-Deoxy-D-fructos-1-yl)-γ-L-glutamyl-(E)-S-1-propenyl-L-cysteine [ARP-γ-L-glutamyl-(E)-S-1-propenyl-L-cysteine] | 4 mmol/L | 3.3 | increase of complexity and mouthfulness, more impact, punch, long lasting, more delicious, chive aroma |

The panel rated the positive control with NaCl more salty than the negative control and the positive control with MSG as having the higher umami intensity, but no kokumi effect was observed for the controls. As apparent from Table 10, however, the tripeptide according to formula (I) has a surprisingly potent kokumi effect.

EXAMPLE 2

Sensory Effects of the Compounds in Water

Sensory (triangle) tests are performed by dissolving the listed compounds in water (Evian®). Additives are added as specified in table below. The pH-value of all samples is adjusted to 6.5 using formic acid (0.1 mol/L) or sodium hydroxide (0.1 mol/L). The results of the tests are indicated in Table 11, below. For each sample, aroma and taste intensity is rated and panelists are asked to describe sensory characteristics.

TABLE 11

| | Sensory effects in water | | |
|---|---|---|---|
| Compound | Concentration of additive | Intensity (0-5) | Sensory descriptors |
| S-methyl-L-cysteine | 10 mmol/L | 0 | flavourless |
| S-ethyl-L-cysteine | 10 mmol/L | 1 | mouth coating, tongue covering, onion aroma |
| S-propyl-L-cysteine | 10 mmol/L | 2 | mouth coating, tongue covering, onion aroma |
| (Z)-S-1-propenyl-L-cysteine S-(E-prop-1-enyl)-cysteine [(E)-S-1-propenyl-cysteine] | 10 mmol/L | 1 | tongue covering, garlic and onion aroma |
| S-allyl-L-cysteine | 10 mmol/L | 1 | mouth covering, strong garlic aroma 3 |
| (E)-S-1-propenyl-L-cysteine S-(E-prop-1-enyl)-cysteine [(E)-S-1-propenyl-cysteine] | 10 mmol/L | 1 | fresh onion aroma |
| S-methyl-L-cysteine-(±)-SO | 10 mmol/L | 0 | flavourless |
| S-ethyl-L-cysteine-(±)-SO | 10 mmol/L | 1 | onion aroma delayed, tongue covering, pungent |
| S-propyl-L-cysteine-(±)-SO | 10 mmol/L | 1 | tongue covering, pungent, delayed onion aroma |
| (Z)-S-1-propenyl-L-cysteine-(±)-SO | 10 mmol/L | 1 | tongue covering, pungent |
| S-allyl-L-cysteine-(±)-SO | 10 mmol/L | 1 | tongue covering, pungent, delayed onion & garlic aroma |
| (E)-S-1-propenyl-L-cysteine-(±)-SO | 10 mmol/L | 0 | onion aroma |
| γ-L-glutamyl-S-methyl-L-cysteine | 10 mmol/L | 0 | flavourless |
| γ-L-glutamyl-S-ethyl-L-cysteine | 10 mmol/L | 0.5 | tongue covering |
| γ-L-glutamyl-S-propyl-L-cysteine | 10 mmol/L | 0.5 | tongue covering |
| γ-L-glutamyl-S-allyl-L-cysteine | 10 mmol/L | 1 | slightly burning, onion aroma |
| γ-L-glutamyl-(E)-S-1-propenyl-L-cysteine | 10 mmol/L | 0.5 | onion aroma |
| γ-L-glutamyl-S-methyl-L-cysteine-(±)-SO | 10 mmol/L | 0 | flavourless |
| γ-L-glutamyl-S-ethyl-L-cysteine-(±)-SO | 10 mmol/L | 0 | flavourless |
| γ-L-glutamyl-S-propyl-L-cysteine-(±)-SO | 10 mmol/L | 0 | flavourless |
| γ-L-glutamyl-S-allyl-L-cysteine-(±)-SO | 10 mmol/L | 0.5 | burning |
| γ-L-glutamyl-(E)-S-1-propenyl-L-cysteine-(±)-SO | 10 mmol/L | 0.5 | onion aroma |
| S-methyl-glutathione [S-methyl-GSH] [S-methyl-γ-L-Glu-L-Cys-Gly] | 10 mmol/L | 0 | slightly sweet 0.5, umami 0.2, tongue covering 1 |
| S-ethyl-GSH [S-ethyl-γ-L-Glu-L-Cys-Gly] | 10 mmol/L | 0 | slightly sweet 0.2, tongue covering 0.5 |
| S-propyl-GSH [S-propyl-γ-L-Glu-L-Cys-Gly] | 10 mmol/L | 0 | flavourless |
| S-allyl-GSH [S-allyl-γ-L-Glu-L-Cys-Gly] | 10 mmol/L | 0 | slightly sweet 0.5, tongue covering 0.5, onion aroma |
| S-methyl-GSH-(±)-SO [S-methyl-γ-L-Glu-L-Cys-(±)-SO-Gly] | 10 mmol/L | 0 | flavourless |
| S-ethyl-GSH-(±)-SO [S-ethyl-γ-L-Glu-L-Cys-(±)-SO-Gly] | 10 mmol/L | 0 | flavourless |

TABLE 11-continued

Sensory effects in water

| Compound | Concentration of additive | Intensity (0-5) | Sensory descriptors |
|---|---|---|---|
| S-propyl-GSH-(±)-SO [S-propyl-γ-L-Glu-L-Cys-(±)-SO-Gly] | 10 mmol/L | 0 | flavourless |
| S-allyl-GSH-(±)-SO [S-allyl-γ-L-Glu-L-Cys-(±)-SO-Gly] | 10 mmol/L | 0 | flavourless |
| γ-L-glutamyl-(E)-S-1-propenyl-L-cysteinyl-S-1-propenyl-L-cysteine-(+/−)-SO [γ-L-Glu-L-Cys-L-Cys-(+/−)-SO] | 5 mmol/L | 0 | flavourless |
| γ-L-glutamyl-(E)-S-1-propenyl-L-cysteinyl-γ-L-glutamyl-(E)-S-1-propenyl-L-cysteine [γ-L-Glu-L-Cys-γ-L-Glu-L-Cys] | 10 mmol/L | 0 | flavourless |

The panel rated the positive control with NaCl more salty than the negative control and the positive control with MSG as having the higher umami (taste of MSG) intensity, but, again, no kokumi effect was observed for the control samples. In addition, without the presence of an inducing or glutamate-containing composition, no kokumi sensation is experienced for the compounds according to the formulae (I) or (II).

EXAMPLE 3

Kokumi Threshold Concentrations of the Compounds in Chicken Soup

The following sensory (triangle) tests were performed by dilution of 10 g chicken soup (Klare Hühner-Suppe extra; Maggi, Singen, Germany) with 1000 mL water (Evian®), filtrations, and using the filtrate in order to determine the kokumi threshold concentrations seen in Table 12, below.

TABLE 12

Kokumi threshold concentrations of the compounds in chicken soup

| Compound | Kokumi threshold concentration μmol/L/mg/L | Sensory descriptors |
|---|---|---|
| S-methyl-L-cysteine | 500/72.5 | increase of complexity and mouthfulness, more impact, punch |
| S-allyl-L-cysteine | 50/8.1 | increase of complexity and mouthfulness, more impact, punch |
| glutathione | 50/15.3 | increase of complexity and mouthfulness, more impact, punch |
| γ-L-glutamyl-(E)-S-1-propenyl-L-cysteine | 50/14.5 | increase of complexity and mouthfulness, more impact, punch |
| γ-L-glutamyl-(E)-S-1-propenyl-L-cysteinyl-S-1-propenyl-L-cysteine-(+/−)-SO [γ-L-Glu-L-Cys-L-Cys-(+/−)-SO] | 40/18 | increase of complexity and mouthfulness, more impact, punch |
| γ-L-glutamyl-(E)-S-1-propenyl-L-cysteinyl-γ-L-glutamyl-(E)-S-1-propenyl-L-cysteine [γ-L-Glu-L-Cys-γ-L-Glu-L-Cys] | 100/56.2 | increase of complexity and mouthfulness, more impact, punch |
| Flash ethanol (ethanol/water) extract | 50 | increase of complexity and mouthfulness, more impact, punch |
| N-(1-Deoxy-D-fructos-1-yl)-S-allyl-L-cysteine [ARP-S-allyl-L-cysteine] | 150/48.5 | increase of complexity and mouthfulness, more impact, punch |
| N-(1-Deoxy-D-fructos-1-yl)-γ-L-glutamyl-(E)-S-1-propenyl-L-cysteine [ARP-γ-L-glutamyl-(E)-S-1-propenyl-L-cysteine] | 100/45.2 | increase of complexity and mouthfulness, more impact, punch |

The flavor enhancing γ-L-glutamyl compounds and Amadori products described herein are useful flavouring ingredients, which, despite the fact that they are virtually devoid of any taste of their own, are nevertheless capable of imparting very much appreciated organoleptic characteristics to the products to which they are added when combined with at least one inducing composition; specifically a quite remarkable roundness, creaminess and substance. Because of this, they can improve the oral perception or "mouthfeel" of products to which they are added. Not only can the flavour enhancing compounds described herein increase organoleptic effects, but they can also provide a fullness of the type of that conferred by the presence of fats in foodstuffs and in flavouring compositions. Because asymmetric carbon atoms are present in the structure of the compounds (I) and (II) of the present invention, they can also occur in the form of a number of configurational isomers that can also be used satisfactorily for the imparting a kokumi effect to foods, either individually, or as mixtures of isomers. Generally, isomers suitable for the present invention include variation of the amino acid sequence, a change in the configuration of chiral center of an amino acid, a change of cis/trans bonding, and changing from 1-propenyl to 2-propenyl(allyl) bonding. Several specific possible isomers useful with the present invention are provided by way of example in Table 13.

be adjusted, depending on the food product, the matrix, the presence of other flavours, and the desired kokumi intensity.

While the γ-glutamyl peptides and Amadori products of the present invention serve as natural flavouring enhancing compounds, the peptides can also be produced synthetically by any means known in the art to provide the same effects. Consequently, in one embodiment, the flavoring enhancing compounds are isolated and purified as natural extracts from the seeds of the Alliacea family. In another embodiment, the flavouring enhancers of the present invention are synthetically produced. In one embodiment, the flavour enhancing compounds can be used in dehydrated form or otherwise, to enhance the flavour of food products.

The flavour enhancing compounds of the present invention can be incorporated into foods in a variety of ways. The compounds may be incorporated into doughs prior to cooking steps or during intermediate stages of a cooking process. The compounds may also be added to food products as toppings to a food product either prior to or after cooking steps such as baking or frying. The state of the flavouring compounds of the present invention at the time when they are added to food products is also unlimited. They may be in a dry powder state, a paste state, or a liquid state. There are a variety of food products in respect of which the kokumi sensation can be provided, including without limitation soups, cheese, baked

TABLE 13

Isomers of the compounds according to formulae (I) and (II).

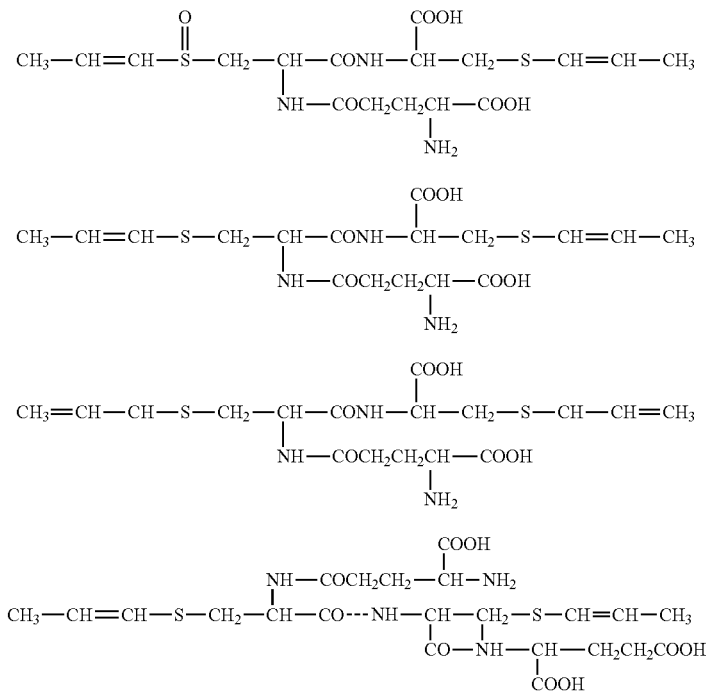

As previously described, the flavouring qualities of compounds of the present invention may be evident over a broad range of concentrations. For example, in one embodiment, a compound or mixture of compounds may be present in a concentration ranging from about 10 to 100 ppm (mg/kg). In another embodiment, at least one flavoring compound or a mixture of compounds of the present invention is present in a concentration of at least 20 ppm in order to impart the kokumi sensation to food products. A skilled person, when armed with this disclosure, will appreciate that the concentration can goods, snack foods, fried products, drinks, vegetables, carrots, tomatoes, nuts, oats, whole grains, salsas, dips, crackers, bread, fruit juices, vegetable juices (e.g., tomato, carrots, sauerkraut, beetroot, etc), sauces (including soy and tomato), mushrooms, fish, beef, pork, chicken, seaweed, tuna, shellfish, oysters, green tea, sweet potatoes, Chinese cabbage, soybeans, dry seasonings (including flavor packets), and any other food in which glutamate or a ribonucleotide is incorporated, whether or not naturally present or intentionally added. Further, since the peptides and Amadori products exhibit a kokumi flavor enhancing function as long as they are added to food products upon eating, the natural flavour enhancers can, at any time, be added to foods or seasonings to realize the kokumi flavor enhancing effect. For example, as discussed above, the γ-L-glutamyl peptides or Amadori products can be added to a raw material before production or during production, or to a finished product after completion, or to a finished product at just before, upon or during eating.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

What is claimed is:

1. A method for producing a kokumi flavour enhancing effect, comprising:
    preparing an *Allium* species mash;
    isolating at least one compound from said mash, wherein said compound is selected from the group consisting of a compound having the formula (a) or (b);

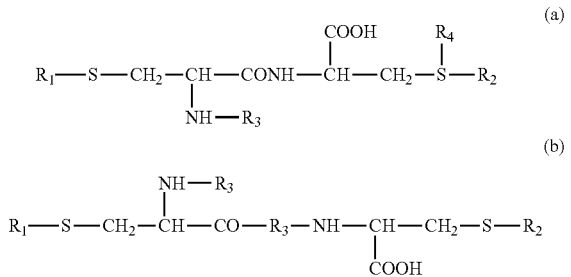

where $R_1$ and $R_2$ are each independently selected from the group consisting of —$CH_3$, —$CH_2CH_3$, —$CH=CH_2$, —$C\equiv CH$, —$CH_2CH_2CH_3$, —$CH=CHCH_3$, and —$CH_2CH=CH_2$;

$R_3$ is an L-γ-glutamyl group or a salt thereof; and $R_4$ is selected from H or O, and in the event that O is selected, the bond between $R_4$ and O is a double bond; and combining any of said compounds of formula (a) or (b) with at least one inducing composition.

2. The method of claim 1, wherein said inducing composition is a food product selected from the group consisting of soup, cheese, baked goods, snack food, fried products, drinks, fruit juice, vegetable juice, sauce, mushroom, and fish.

3. The method of claim 1, wherein at least 20 ppm of said isolated compound is combined with said inducing composition.

4. The method of claim 1, wherein the *Allium* species mash is prepared by crushing the seeds of the *Allium* species.

5. The method of claim 1, wherein said *Allium* species is *Allium ursinum*.

6. The method of claim 1, wherein said *Allium* species is *Allium schoenoprasum*.

7. The method of claim 1, wherein said process further comprises subjecting one of said isolated compounds and at least one reducing sugar to conditions that produce an Amadori product prior to combining said compound with said inducing composition.

8. The method of claim 7, where said reducing sugar is selected from the group consisting of glyceraldehydes, erythrose, threose, ribose, arabinose, xylose, lyxose, allose, altrose, glucose, mannose, gulose, idose, galactose, talose, tetrulose, ribulose, xylulose, psicose, fructose, sorbose, tagatos, fucose, cellobiose, gentiobiose, isomaltose, lactose, lactulose, maltose, maltulose, melibiose, neohesperidose, nigerose, palatinose, rutinose, fucosidolactose, maltotriose, manninotriose, panose, maltotetraose, stachyose, and any combination thereof.

9. The method of claim 1 wherein said inducing composition is selected from the group consisting of monosodium glutamate, 5'-inosine monophosphate, 5'-guanosine monophosphate, and beef extracts.

10. The method of claim 1, wherein the compound isolated from the *Allium* species mash is γ-L-glutamyl-(E)-S-1-propenyl-L-cysteinyl-γ-L-glutamyl-(E)-S-1-propenyl-L-cysteine, and further wherein at least about 56 mg/L of said compound is combined with said inducing composition.

11. The method of claim 1, wherein the compound isolated from the *Allium* species mash is γ-L-glu-(E)-S-(propen-1-yl)-L-cys-(E)-S-(propen-1-yl)-L-cys-(+/)-SO, and further wherein at least about 18 mg/L of said compound is combined with said inducing composition.

12. The method of claim 1, wherein $R_1$ and $R_2$ have a trans-configuration.

13. The method of claim 1, wherein $R_1$ and $R_2$ have a cis-configuration.

14. The method of claim 1, wherein said inducing composition is corn.

15. The method of claim 1, wherein said inducing composition is a potato.

16. The method of claim 1, wherein said purified compound enhances at least one of salty taste, sweet taste, sour taste, bitter taste, or umami taste.

17. The method of claim 1 further comprising a step of purifying said compound before the combining step.

* * * * *